(12) United States Patent
Sievert et al.

(10) Patent No.: US 12,182,928 B2
(45) Date of Patent: Dec. 31, 2024

(54) SYSTEM AND METHODS FOR GENERATING A 3D MODEL OF A PATHOLOGY SAMPLE

(71) Applicant: INVEOX GMBH, Garching bei München (DE)

(72) Inventors: Maria Sievert, Munich (DE); Dominik Sievert, Munich (DE)

(73) Assignee: INVEOX GMBH, Munich (DE)

( * ) Notice: Subject to any disclaimer, the term of this patent is extended or adjusted under 35 U.S.C. 154(b) by 188 days.

(21) Appl. No.: 17/761,576

(22) PCT Filed: Sep. 16, 2020

(86) PCT No.: PCT/EP2020/075904
§ 371 (c)(1),
(2) Date: Mar. 17, 2022

(87) PCT Pub. No.: WO2021/053035
PCT Pub. Date: Mar. 25, 2021

(65) Prior Publication Data
US 2022/0383584 A1    Dec. 1, 2022

(30) Foreign Application Priority Data
Sep. 18, 2019    (EP) ..................................... 19198113

(51) Int. Cl.
*G06T 15/08*    (2011.01)
*G06T 17/00*    (2006.01)
*G06V 10/44*    (2022.01)

(52) U.S. Cl.
CPC .............. *G06T 15/08* (2013.01); *G06T 17/00* (2013.01); *G06V 10/457* (2022.01)

(58) Field of Classification Search
CPC . G06T 2207/20021; G06T 2207/20132; G06T 2207/30024; G06T 2207/30204;
(Continued)

(56) References Cited

U.S. PATENT DOCUMENTS 10,022,192 B1 *   7/2018   Ummalaneni ......... B25J 9/1694
10,169,029 B2 *   1/2019   Borley ..................... G06F 8/65
(Continued)

FOREIGN PATENT DOCUMENTS

WO    2019046774 A1    3/2019

OTHER PUBLICATIONS

International Search Report and Written Opinion dated Mar. 15, 2021 for corresponding International Application No. PCT/EP2020/075904.
(Continued)

Primary Examiner — Ming Wu
(74) Attorney, Agent, or Firm — Tarolli, Sundheim, Covell & Tummino LLP

(57) ABSTRACT

A system and a method for generating a combined 3D model (95) of a sample comprising a sample imaging system (1) configured to generate a first 3D model (25) of the sample, a slice imaging system (2) configured to generate a second 3D model (615) of the sample, and a combiner engine (90) configured to generate a combined 3D model (95) based on the first 3D model and the second 3D model of the sample.

18 Claims, 10 Drawing Sheets

(a)

(b)

(c)

(58) Field of Classification Search
CPC .. G06T 7/248; G06T 7/62; G06T 7/70; G06T 7/90; G06V 10/50; G06V 10/507; G06V 10/56; G06V 20/69; G06V 20/693; G06V 20/695

See application file for complete search history.

(56) References Cited

U.S. PATENT DOCUMENTS

| | | |
|---|---|---|
| 2007/0003120 A1 | 1/2007 | Pinset |
| 2016/0279879 A1* | 9/2016 | Zheng .................... B33Y 50/02 |
| 2016/0361877 A1 | 12/2016 | Yoshida |
| 2017/0109447 A1* | 4/2017 | Wu ........................ G06Q 50/01 |
| 2017/0161428 A1 | 6/2017 | Mitra |

OTHER PUBLICATIONS

Examination Report dated Nov. 9, 2024 in European Application No. 20775245.2.

* cited by examiner (a)

(b)

(c)

SYSTEM AND METHODS FOR GENERATING A 3D MODEL OF A PATHOLOGY SAMPLE

RELATED APPLICATIONS

The present application is a U.S. National Stage application under 35 USC 371 of PCT Application Serial No. PCT/EP2020/075904, filed on 16 Sep. 2020; which claims priority from EP patent application Ser. No. 19/198,113.3, filed 18 Sep. 2019, the entirety of both of which are incorporated herein by reference.

FIELD OF INVENTION

The present invention generally relates to the detection of samples, particularly of histological, pathological, medical, biological, veterinary or agricultural samples, contained in a sample container.

BACKGROUND

The term pathology or histology itself is usually referred to the study of disease in general, incorporating a wide range of bioscience research fields and medical practices (including plant pathology and veterinary pathology), or more narrowly to describe work within the contemporary medical field of "general pathology," which includes a number of distinct but inter-related medical specialties that diagnose disease—mostly through analysis of tissue, cell, and body fluid samples.

As a field of general inquiry and research, pathology addresses four components of disease: cause, mechanisms of development (pathogenesis), structural alterations of cells (morphologic changes), and the consequences of changes (clinical manifestations). In common medical practice, general pathology is mostly concerned with analyzing known clinical abnormalities that are markers or precursors for both infectious and non-infectious disease and is conducted by experts in one of two major specialties, anatomical pathology and clinical pathology. Further divisions in specialty exist on the basis of the involved sample types (comparing, for example, cytopathology, hematopathology, and histopathology), organs (as in renal pathology), and physiological systems (oral pathology), as well as on the basis of the focus of the examination (as with forensic pathology).

The largest amount of samples origin from biopsies and are tissue samples. Presently they are collected by doctors and further downstream handled by staff. The biopsy samples are put into container with preservation liquids, shipped and then manually extracted from the containers in a laboratory for further examination.

This procedure can cause errors regarding the origin of the samples and also expose the staff to infectious or poisonous material.

WO 2019046774 A1 relates to a method for generating 3d images by scanning a whole tissue block.

SUMMARY

In a first embodiment, the present invention relates to a sample imaging system configured to generate a three-dimensional (3D) model of a sample. The sample may be a specimen, such as at least one of histological, pathological, forensic pathology, medical, biological, veterinary, surgical, anatomical, agricultural and/or biopsy sample. Thus, the sample imaging system can be utilized in a histology laboratory. The sample imaging system can facilitate treating, processing and preparing samples in a histology laboratory for histological (or histopathological) examination. More particularly, the sample imaging system can facilitate the automation of sample treatment in a histological laboratory.

The sample imaging system can be advantageous as it can facilitate estimating sample features automatically. That is, from the generated 3D model (or during the generation of the 3D model) sample features can be extracted, such as, a sample size, sample volume, sample type, sample outer shape, sample shell (or surface) structure and sample surface color. Information about the sample features can further facilitate sample handling during histological treatment (i.e. histology slide preparation).

The sample imaging system can be utilized during a sample accessioning step. The sample accessioning step is generally performed when a sample is received in a laboratory for histological treatment and consists on registering the sample, sample data (e.g. type of sample), sample history data (e.g. originating patient) in the laboratory information system. In this step, the sample imaging system can facilitate registering (i.e. accessioning) the sample in the laboratory information system. For example, the 3D model generated by the sample imaging system and/or sample features that can be extracted from the 3D model (as discussed above) can be included in the sample data during sample registration.

The sample imaging system can be utilized before and after a histology treatment step, such as, after each histology treatment step. This can be advantageous as it can facilitate detecting changes that can be caused to the sample during the histology treatment step. The changes may include a change in sample size, volume, shape, color and sample damages. For example, the sample imaging system can be performed before and after sample dehydration step. This can facilitate estimating the amount of shrinkage the sample experienced during the dehydration step.

The sample imaging system generates a 3D model of the sample based on the whole sample. That is, the sample imaging system does not require sample intrusion. As such, the sample is not damaged during the generation of the 3D model. On the other hand, since the sample imaging system generates a 3D model from the whole sample, information about the general structure or surface structure or outer shape of the sample can be better or accurately represented by the 3D model. That is, the generated 3D model can accurately represent the surface of the sample. Moreover, the generated 3D model can comprise dimensional information corresponding to the sample. Further still, the generated 3D model can represent the surface of the sample with a high detailedness.

The sample imaging system comprises at least one sensor device. The at least one sensor device is configured to acquire a plurality of sensor data sets related to a plurality of sides of the sample. That is, the sensor device can sense or measure or image a plurality of sides of the sample, preferably all the sides of the sample. This can allow for an accurate modeling of the surface of the sample.

A measurement performed by the at least one sensor device can comprise acquiring dimensional information related to the sample, such as, length, width and/or thickness of the sample. That is, the sensor data sets that can be acquired by the at least one sensor device can comprise dimensional information related to the sample, such as, a length, width and/or thickness of the sample. Alternatively, or additionally, the dimensional information may relate to a length and/or width of at least one side of the sample.

The sample imaging system further comprises a data processing device configured to process the plurality of sensor data sets to generate a first 3D model of the sample. That is, the data processing device can be configured to extract from the plurality of sensor data sets a plurality of sides of the sample. Based on the extracted plurality of sides of the sample, the data processing device can calculate a representation (e.g. a mathematical representation) of the surface of the sample. The generated first 3D model can comprise a shell (or boundary) model. That is, it can comprise a representation of the surface of the sample. Furthermore, the first 3D model can comprise or indicate a shape of the sample, size of the sample, volume of the sample, color of the sample surface, type of the sample, structure of the surface of the sample.

In some embodiments, the data processing device can facilitate controlling (or triggering) the components of the sample imaging system. For example, the data processing device may comprise a controlling unit and a 3D modeling unit. The controlling unit can execute tasks related to controlling the components of the sample imaging system, while the 3D modeling unit can execute tasks related to the 3D modeling unit. The data processing device can further facilitate visualizing or displaying the generated 3D model in a human understandable format (e.g. visual format).

Thus, in some embodiments, the data processing device can be configured to trigger the at least one sensor device to acquire at least one sensor data set. The data processing device can trigger the at least one sensor device based on a routine which can ensure that a plurality of sides of the sample are sensed.

The sample imaging system can further comprise a sample configured to move or transport or handle the sample. The sample positioning device can be configured to position the sample in multiple positions and orientations (i.e. poses) relative to the at least one sensor device such that multiple or different sides of the sample can be shown to the at least one sensor device. The sample positioning device can facilitate acquiring sensor data sets related to a plurality or different sides of the sample.

In some embodiments, the sample positioning system can be configured to rotate the sample. The rotation can preferably be performed in a stepwise manner, wherein each step can be at most 180°, preferably at most 10°, such as 3.6°. It will be understood that the values of the rotation step are exemplary. In general, a more granular rotation can increase the number of sides that the sample can show to the sensor device which can facilitate increasing the amount of detail represented in the 3D model. However, this may be tailored with increase in time and processing power required to compute the 3D model. Furthermore, in some embodiments, it can be advantageous to perform a full rotation of the sample. This can increase the amount of surface that can be sensed by the at least one sensor device.

However, it will be understood that in some embodiments the rotation of sample may not be performed or required. For example, in some embodiments, the sensor may be rotated instead (discussed further below). Alternatively, the sensor device can be configured to assess or measure the entire 3D structure of the sample without the need of rotation.

In some embodiments, the sample positioning system can comprise a stepper motor. The stepper motor can particularly be advantageous for rotating the sample and particularly for rotating the sample in a stepwise manner.

In some embodiments, the data processing device can be configured to trigger the sample positioning device to produce a motion of the sample. For example, the data processing device can trigger the sample positioning device (e.g. the stepper motor) to generate a rotation. The data processing device may trigger the sample positioning device by providing a control signal comprising a direction and angle of rotation. The sample positioning device may receive the control signal and generate a motion according to the received control signals.

In some embodiments, the data processing device can be configured to trigger (or control) both the sample positioning system and the at least one sensor device. Moreover, the data processing device can be configured to synchronize the triggering of the at least one sensor device and the sample positioning device. For example, the data processing device can alternate the triggering of the at least one sensor device and the sample positioning device. This can be particularly advantageous for capturing sensor data related to different sides of the sample. That is, each rotation of the sample will show a slightly or entirely different portion of the surface of the sample to the sensor device and thus each triggering of the sensor device can acquire sensor data related to a slightly or entirely different portion of the surface of the sample.

In some embodiments, the sample can be provided to the sample imaging system contained in a sample container. This can particularly be the case when the sample imaging system can be utilized during the sample accessioning phase in a laboratory. In such embodiments, the sample imaging system can be configured to generate the 3D model of a sample comprised in a sample container. That is, sensor data of the sample in the sample container can be acquired and based on the acquired sensor data the 3D model of a sample in the sample container can be generated.

The generation of the 3D model can further depend on the process or technique or sensor device used to acquire the sensor data. For example, the relative position between the at least one sensor device and the sample can be further utilized to generate the 3D model.

The sample container can comprise a cavity surrounded by a body of the sample container. The body of the sample container can comprise a base and a free top-opening. The sample container can further comprise a cap configured to enclose the top-opening.

The body of the sample container can comprise a cylindrical shape.

The body of the sample container can be composed of a transparent solid material. This can allow the sample in the sample container to be visible to the sensor device.

The cap of the sample container can comprise a non-circular (or non-cylindrical) shape. For example, a cross-section of the cap (or the cap as seen from a top or bottom view) can comprise an n-edged shape, such as, an 8-edged shape. This can facilitate handling the sample container, such as, rotating the sample container as the n-edged shape can provide support for rotating the sample container.

The cap of the sample container can be connected to the body of the sample container in a releasable manner. That is, the cap can be attached to the body of the sample container, thus enclosing the top-opening of the sample container. However, by exerting a force on the cap and/or body of the sample container, the cap can be released from the body of the sample container without damaging the cap or the body of the sample container. For example, the cap can be released through a pull or twisting action.

The cavity of the sample container can be occupied by at least one sample and with at least one fluid, such as, a preservation, nurturing and a fixating fluid. This can allow the sample to be contained in the sample container. Furthermore, the contained fluid can prevent the sample from decaying.

In some embodiments, the sample positioning device can be configured to generate a sudden motion of the sample container, such as, a motion that lasts at least 0.05 seconds and at most 5 seconds, and wherein the sudden motion can be a rotational and/or translational motion. The sudden motion can particularly be advantageous in embodiments wherein the sample is provided in a sample container filled with a fluid. The sudden motion can cause the sample to float in the fluid which can increase the amount of surface exposed to the sensor device and can facilitate capturing sensor data related to multiple sides of the sample.

The sample container can comprise at least one marker, such as 2 to 4 markers. The markers can be positioned in or on the cap. The sample container can further comprise an identification label configured to hold at least one information field for identification and/or automation purposes. The identification label can comprise at least one field configured to provide human and/or machine-readable information related to the sample and/or the liquid housed by the container and/or to the originator of the sample. The identification label can comprise at least one field with an electronically readable information source, preferably a RFID chip. The identification label can comprise at least one field, such as, a QR-code and/or a barcode, that can be detected by the data processing device on at least one data set captured by the sensor device.

The at least one marker and the identification label can be positioned on the sample container, such that the at least one marker indicates the position of the identification label. More particularly, the at least one marker can indicate an advantageous orientation of the sample container such that the identification label can be observed.

The sample imaging system can comprise a container base. The container base can be configured to facilitate receiving, supporting and/or handling the sample container.

The sample positioning device can be configured to transmit motion to the sample container through the container base. That is, the sample positioning device can be configured to move the container base, which can then cause the sample container to move.

In some embodiments, at least one sensor device can be provided in the container base. This can allow a view point towards the base of the sample container. This can increase the number of sides of the sample that can be imaged and thus represented on the 3D model.

That is, the sample imaging system may comprise at least one sensor device comprising a field of view towards the lateral side(s) of the sample (or sample container). Additionally, the sample imaging system can comprise at least one sensor device comprising a field of view towards the base of the sample (or sample container).

In some embodiments, the sample imaging system can further comprise a sensor positioning device that can be configured to handle, transport, move and/or rotate at least one sensor device, such that the at least one sensor device can be positioned in multiple poses relative to the at least one sample. That is, the sensor positioning device can move a sensor device around the sample. This can allow the sensor device to "see" different sides of the sample, thus facilitating acquiring sensor data sets related to a plurality of sides of the sample. For example, the sensor positioning device can be configured to position the at least one sensor device in any point on the surface of at least one sphere with the center on or near the sample and/or in any point on the surface of at least one cylinder with the central axis coinciding with the central vertical axis of the sample and/or in any point of at least one circle with the center on or near the sample.

In some embodiments, the sensor positioning device can comprise a stepper motor. The stepper motor can be configured to rotate the at least one sensor device around the sample. Moreover, the stepper motor can facilitate a stepwise rotation of the sensor device. Thus, the sensor device can be rotated (according to the rotation step), acquire sensor data and be rotated again (according to the step).

The sensor positioning device can be advantageous as it can facilitate capturing sensor data sets of multiple sides of the sample. This can be achieved even if there is only one sensor device handled by the sensor positioning device. Alternatively, or additionally, in some embodiments, the sample imaging system may comprise a plurality of sensor devices. The plurality of sensor devices can be arranged such that they can comprise different viewpoints to the sample. This can further facilitate capturing sensor data sets of multiple sides of the sample. In some embodiments, the plurality of sensor devices can be triggered simultaneously to obtain a respective sensor data set related to the sample.

In some embodiments, the at least one sensor device may comprise different types of sensors, each configured to generate corresponding (and different) data sets that can be used to generate the 3D model during the 3D reconstruction.

In some embodiments, the at least one sensor device can comprise at least one visual sensor, such as, at least one camera configured to capture images of the sample. In such embodiments, the sensor data set can comprise images of the sample.

In some embodiments, the at least one sensor device can comprise at least one depth sensor, such as, at least one time-of-flight sensor and/or at least one stereo camera configured to capture distance images of the sample. In such embodiments, the sensor data set can comprise distance images of the sample.

In some embodiments, the at least one sensor device can comprise at least one scanning device, such as, at least one laser scanning device, e.g., at least one LIDAR (i.e. light detecting and ranging), also referred to as LADAR (i.e. laser detection and ranging) sensor configured to scan the sample. The laser scanning device, such as, the LIDAR sensor, can allow for a more detailed measurement of the at least one sample. In such embodiments, the sensor data set can comprise distance (or range) images of the sample.

In some embodiments, the at least one sensor device can comprise at least one ultrasound sensor configured to obtain a graphical representation of the sample based on ultrasound measurements. In such embodiments, the sensor data set can comprise sonograms of the sample.

In some embodiments, the at least one sensor device can be configured to acquire multiple projections of the sample. The data processing device can be configured to generate the 3D model from the multiple projections of the sample based on a tomographic reconstruction technique.

In some embodiments, the data processing device can be configured to extract a side (i.e. a portion of the surface or face) of the sample from a sensor data set. That is, a data processing device can be configured to process the plurality of sensor data sets captured by the at least one sensor device for detecting and extracting a portion of the data comprised in the sensor data set that relates to the sample. In other words, the data processing device can be configured to differentiate from sensor data related to the sample and sensor data related to a background.

The data processing device can be configured to detect at least one side of the sample in a sensor data set by executing an edge detection algorithm. That is, on the boundary between the sample and the background an abrupt transition (or change) in the sensor data set can be detected. Such abrupt transitions can be detected, and it can be inferred or determined whether they relate to the edge of the sample. The sample edge detection can be facilitated by configuring the background to comprise different features (e.g. different colors) from the sample.

Alternatively, or additionally, in some embodiments the data processing device can be configured to detect a side of a sample in a sensor data set by executing a blob detection algorithm. That is, data processing device can be configured to detect on a sensor data set (e.g. image) a continuous portion or area (i.e. blob) that share a similar feature (e.g. similar color, similar distance, etc.). This can allow for the detection of the sample side in a sensor data set.

The data processing device can further receive for each sensor data set corresponding viewpoint data. For example, the viewpoint data can comprise the relative position between the sample and the sensor device when the sensor data set was obtained. Thus, the view point data corresponding to a sensor data set can indicate which side of the sample is comprised the sensor data set.

The data processing device can extract a plurality of sides of the sample from the plurality of sensor data sets (e.g. as discussed above). Furthermore, the data processing device can utilize the corresponding viewpoint data assigned to each sensor data set to infer the relative position between the extracted sides. Based on this information, the data processing device can arrange the extracted sides of the sample for synthesizing the first 3D model. During the arranging of the extracted sides, the data processing device can be configured to rotate, scale, move, skew and/or merge the extracted sides of the sample.

In some embodiments, the first 3D model can comprise a shell (or boundary) model representing the surface (or outer shape) of the sample.

In some embodiments, the first 3D model can comprise a mathematical representation of a plurality of surfaces or sides of the sample.

In some embodiments, the first 3D model can comprise a machine-readable representation of a plurality of surfaces or sides of the sample.

In some embodiments, the first 3D model can comprise a virtual visual model of a plurality of surfaces or sides of the sample.

In a second embodiment, the present invention relates to a slice imaging system configured to generate a second three-dimensional (3D) model of a sample. The sample may be a specimen, such as at least one of histological, pathological, forensic pathology, medical, biological, veterinary, agricultural tissue and/or biopsy sample. Thus, the slice imaging system can be utilized in a histology laboratory. The slice imaging system can facilitate treating, processing and preparing samples in a histology laboratory for histological (or histopathological) examination. More particularly, the slice imaging system can facilitate the automation of sample treatment in a histological laboratory.

The slice imaging system can be advantageous as it can facilitate estimating sample features automatically. That is, from the generated 3D model (or during the generation of the 3D model) sample features can be extracted, such as, a sample size, sample volume, sample type, sample outer shape, sample shell (or surface) structure and sample surface color. Information about the sample features can further facilitate sample handling during histological treatment (i.e. histology slide preparation). In addition, the second 3D model generated by the slice image system can comprise one or more cross-sectional views of the sample. As such, the second 3D model can further facilitate a diagnosis of the sample generally preformed during a histology, histopathology, surgical, anatomical, pathology, forensic pathology examination or other similar tissue examinations.

The slice imaging system can be utilized in a histology laboratory after a sample sectioning step. The sample sectioning step generally consists of sectioning or cutting or slicing a sample in multiple thin slices.

The slice imaging system generates a 3D model of the sample based on slices of the sample. This can allow the slice imaging system to obtain multiple cross-sectional views of the sample. Thus, the second 3D model generated by the slice imaging system can be advantageous as it can provide not only a representation of the outer shape of the sample, but it can also provide one or more cross-sectional views of the sample (i.e. a representation of the internal structure of the sample).

The slice imaging system comprises a slice imaging device. The slice imaging device is configured to acquire a plurality of sensor data sets related to a plurality of slices of the sample. That is, the slice imaging device can sense or measure or image a plurality of slices of the sample, preferably all the slices of the sample. This can allow for an accurate modeling of the surface of the sample and the internal structure of the sample.

The slice imaging system further comprises a 3D rendering engine configured to process the plurality of sensor data sets to generate a second 3D model of the sample. That is, the 3D rendering engine can be configured to extract from the plurality of sensor data sets a plurality of cross-sectional views (i.e. cross-sectional shapes, shapes of slices) of the sample. Based on the extracted plurality of cross-sectional views of the sample, the 3D rendering engine can calculate a representation (e.g. a mathematical representation) of the surface of the sample as well as a representation of one or more cross-sectional views or slices of the sample. The generated second 3D model can comprise a solid model of the sample. That is, it can comprise a representation of the surface of the sample. Furthermore, the first 3D model can comprise or indicate a shape of the sample, size of the sample, volume of the sample, color of the sample surface, type of the sample, structure of the surface of the sample. Furthermore, the second 3D model can comprise a representation of the internal structure of the sample. Said representation may comprise one or more cross-sectional views, that is, one or more representation of the slices of the sample.

In some embodiments, a slice of the sample can comprise a thickness of at least 0.05 micrometers and at most 100 micrometers.

In some embodiments, a slice of the sample can be generated by cutting or sectioning or slicing a sample with a sectioning device, such as a microtome. In such embodiments, the slice imaging system can be configured to receive the plurality of slices of the sample from the sectioning device. That is, the plurality of slices of the sample can be transported or handled from the sectioning device to the slice imaging system.

In some embodiments, the slice imaging system can be integrated or embedded in the sectioning device (or vice versa). Thus, the slices of the sample can be directly imaged after being cut. Alternatively, the cross-sections of the sample can be imaged after each slice removal. That is, before each cutting operation, a sensor data set of the exposed cross-section of the sample is obtained. Then, the sample can be cut. Thus, a slice can be removed from the sample and a new cross-section of the sample can be exposed and a sensor data set related to the exposed cross-section of the sample can be obtained. This can be repeated until a plurality of sensor data sets of a plurality of cross-sections of the sample can be obtained. In other words, in such embodiments, each slice can be imaged while still attached to the sample. Afterwards, the slice can be cut and the subsequent slice can be imaged (again while it is still attached to the sample). This process can be repeated for multiple or each slice of the sample. Such embodiments are particularly advantageous as they alleviate the issues related to slice orientation and/or ordering which arise during the generation of the 3D model from slice images.

In some embodiments, the slices of the sample are stained. This can be advantageous as in stained slices the cellular structures are generally more visible.

In some embodiments, the slice imaging system comprises a staining device.

In some embodiments, the slices of the sample can be de-wrinkled. For example, the slices can be immersed in warm water after sectioning. This can be advantageous as during sectioning the slices can comprise wrinkles. The wrinkles may introduce errors during the generation of the second 3D model. Thus, de-wrinkling the slices can improve the accuracy of the second 3D model.

In some embodiments, the slice imaging system comprises a de-wrinkling device.

In some embodiments, the slice imaging system can be configured to receive the slices of the sample attached to a slide. This can be advantageous as it can facilitate handling the slices. It can also preserve the slices from being damaged or teared (due to their very thin structure). In addition, attaching the slices on a slide can flatten the slices and can thus allow for the imaging of the entire area of the slice.

In some embodiments, the slice imaging system can comprise a plurality of slides, each configured to facilitate attaching a slice of the sample on a portion of the surface of the slide.

In some embodiments, the plurality of slides can be configured as microscope slides.

In some embodiments, the slides can comprise a slide label section wherein a slide label can be attached and/or stuck and/or written and/or printed and/or laser marked.

In some embodiments, the slide label can comprise at least one field configured to provide human and/or machine-readable information related to the slice of the sample attached to the corresponding slide.

In some embodiments, the slide label can comprise at least one field with an electronically readable information source, preferably a RFID chip.

In some embodiments, the slide label can comprise information related to the sample and/or the slice of the sample attached to the corresponding slide. Said information may comprise the thickness of the slice, the position of the slice on the sample (e.g. a sequential number indicating the order of the slice), orientation of the slice. Additionally, the slide label can comprise an identification number assigned to the sample, which can be used for tracking the sample.

In some embodiments, the slices of the sample can be generated by sectioning a sample embedded in a hardening medium, such as, paraffin.

In some embodiments, the slices of the sample can be generated by sectioning a frozen sample.

In some embodiments, the slices of the sample can compose at least 5% of the sample, preferably at least 50% of the sample, even more preferably at least 80% of the sample.

In some embodiments, the slices of the sample can be uniformly distributed over the entire thickness of the sample.

In some embodiments, the slices of the sample can relate to a predefined portion of the sample. The predefined portion of the sample may comprise a portion of interest of the sample. That is, in some cases not the whole sample may be of interest (e.g. for the histological examination) but, only a portion of it. This portion may be predefined (e.g. an inner part of the sample) and the slices can be selected or cut such that they relate to the predefined portion of the sample. As such, the 3D model can be generated only for the predefined portion of the sample.

In some embodiments, the slice imaging device can comprise at least one visual sensor, such as, at least one camera configured to capture images of the slices of the sample.

In some embodiments, the slice imaging device can comprise at least one pathology scanner configured to capture an image of a slice of the sample.

In some embodiments, the slice imaging device can comprise at least one laser scanner.

In some embodiments, the slice imaging device can comprise at least one fluorescence sensor.

In some embodiments, the slice imaging device can comprise a pathology slide scanner configured to capture an image of a slide comprising a slice of the sample.

In some embodiments, the sensor data set can comprise images of the slices of the sample. This can for example be color images.

In some embodiments, the slice imaging device can comprise a slice storage configured to receive and store a plurality of slices of the sample. This can be advantageous as it can allow for a plurality of slices to be provided to the imaging device. The imaging device can be configured to automatically handle and/or image the slices.

In some embodiments, the slice imaging device can be configured to automatically image a plurality of slices of the sample.

In some embodiments, the slice imaging device can be configured to simultaneously image a plurality of slices of one or more samples.

In some embodiments, the slice imaging device can be configured to capture magnified images of the slices of the sample. This can provide a more detailed view (or representation) of the slices. Magnification of the slices can particularly make cellular structures more visible, which can facilitate a diagnosis of the sample.

In some embodiments, the magnification can be between 2-60. That is, the slices can appear at least two times and at modes 60 times bigger in the sensor data set than they actually are.

In some embodiments, the slice imaging device can be configured to detect the slide label of the slide.

In some embodiments, the slice imaging device can be configured to extract information comprised on the slide label. This can allow the imaging device to automatically obtain the information contained in the slide label, such as, information related to the slice comprised in the slide.

The 3D rendering engine can be configured to receive the plurality of the sensor data sets that can be acquired (i.e. captured, obtained) by the slice imaging device. That is, the 3D rendering engine and slice imaging device can comprise a data connection between each other which can allow the slice imaging device to send the plurality of sensor data sets to the 3D rendering engine. Alternatively or additionally, the 3D rendering engine and the slice imaging device can access a memory component. In such embodiments, the slice imaging device can be configured to store the sensor data sets that it can acquire to the memory component. The 3D rendering engine can be configured to receive the sensor data sets from the memory component.

The 3D rendering engine can be configured to extract from each sensor data set the shape of the slice of the sample captured therein. In more particular, each sensor data set can relate to a respective slice of the sample. That is, each sensor data set can comprise or can be configured to comprise or it can be extracted from therein a graphical representation of the slice of the sample. The 3D rendering engine can be configured to process the sensor data set and extract the shape of the slice of the sample. Extracting the shape of the slice of the sample may comprise determining and/or outputting the portion of the sensor data set (e.g. a plurality of pixels of the sensor data set) that relate to or capture the area of the slice of the sample and/or to the boundary of the sample.

In some embodiments, the 3D rendering engine can be configured to detect the shape of a slice in a sensor data set by executing an edge detection algorithm. That is, on the boundary between the slice and the background an abrupt transition (or change) in the sensor data set can be present. Such abrupt transitions can be detected and it can be inferred or determined whether they relate to the edge of the slice of the sample. The slice edge detection can be facilitated by configuring the background to comprise different features (e.g. different colors) from the slice of the sample.

Alternatively or additionally, in some embodiments the 3D rendering engine can be configured to detect the shape of a slice of a sample in a sensor data set by executing a blob detection algorithm. That is, the 3D can be configured to detect on a sensor data set (e.g. image) a continuous portion or area (i.e. blob) that share a similar feature (e.g. similar color, similar distance, etc.). This can allow for the detection of the slice of the sample (which can appear as a blob) in a sensor data set.

In some embodiments, the 3D rendering engine can be configured to utilize a pre-trained deep learning architecture, such as, a deep convolutional neural network, to extract a slice of the sample from a sensor data set. The deep learning algorithm or architecture can be pre-trained with annotated sensor data sets (i.e. sensor data sets that comprise indications regarding the presence and/or position of slices in a sensor data set). During the training, the deep learning architecture can adjust one or more parameters such that it can improve the likelihood of correctly detecting a slice in a sample data set.

In some embodiments, the 3D rendering engine can be configured to use image segmentation to extract a slice of the sample from a sensor data set. Image segmentation can comprise portioning the sensor data set into multiple segments (e.g. groupings of pixels based on similar features the pixels can share). This can simplify the detection of slices in a sensor data set.

In some embodiments, extracting a slice of the sample can comprises identifying a portion (or pixels) of the sensor data set related to the slice of the sample. That is, the 3D rendering engine can be configured to detect or identify on a sensor data a portion or partition or group of pixels of the sensor data set that relate to the slice of the sample.

In some embodiments, the extracted shape of the slice of the sample can relate to the shape of a cross-section of the sample.

In some embodiments, the 3D rendering engine can be configured to generate the second 3D model based on the extracted shape of the slices of the sample. That is, the 3D rendering engine can reconstruct the shape of the sample based on the extracted shape of the slices of the sample and generate the second 3D model. As such, the second 3D model can comprise (or estimate) not only the outer shape of the sample, but can also provide cross-sectional views of the sample.

In some embodiments, the 3D rendering engine can be configured to generate the second 3D model based on additional information indicating features of the slices, such as, the thickness of the slices or the position of the slices on the sample (i.e. the order of the slices) or the orientation of the slices relative to each other or any combination thereof. That is, the accuracy of the second 3D model can be improved by considering the thickness of the slices or the position of the slices on the sample (i.e. the order of the slices) or the orientation of the slices relative to each other or any combination thereof.

In some embodiments, the 3D rendering engine can be configured to receive additional information indicating features of the slices, such as, the thickness of the slices or the position of the slices on the sample (i.e. the order of the slices) or the orientation of the slices relative to each other or any combination thereof. That is, the said additional information can be readily provided to the 3D rendering engine.

In some embodiments, the 3D rendering engine can be configured to receive the thickness of the slice. For example, the 3D rendering engine can be configured to read a slice thickness setting of a sectioning device, such as, a microtome, used to slice the sample.

In some embodiments, wherein the slices can be provided in labelled slides, the 3D rendering engine can be configured to extract the slice thickness from the slide label. For example, the 3D rendering engine can be configured to extract the slice thickness from a machine-readable code (e.g. QR code, barcode) comprised in the label of the slide.

In some embodiments, the slice imaging system can further comprise a slice thickness measuring device configured to measure the thickness of a slice of the sample.

In some embodiments, the slice imaging system can be configured to maintain the orientation and/or ordering of the slices of the sample unchanged until they are imaged by the slice imaging device. That is, the slices can be provided to the slice imaging device with the same order and/or orientation as they had when they were part of the sample. This can facilitate generating the second 3D model as less processing may be required to be performed by the 3D rendering engine. Additionally, as the slices can be imaged in the correct order and/or orientation, the likelihood of generating the second 3D model from erroneously ordered and/or oriented slides can be reduced. As such, a more accurate second 3D model that better represents the sample can be generated. However, in such embodiments a careful handling of the slices of the sample may be required.

In some embodiments, the 3D rendering engine can be configured to transform the sensor data sets. This can be advantageous as it can allow the 3D rendering engine to bring the sensor data sets (and the respective slices or extracted shapes of slices captured therein) into spatial alignment with each other. This can facilitate generating the second 3D model.

In some embodiments, the 3D rendering engine can be configured to transform a sensor data set by re-ordering, moving, scaling, skewing, rotating, discarding the sensor data set or any combination thereof. This can allow the 3D rendering engine to arrange the sensor data sets such that the slices captured therein can be arranged similar to as they were in the sample before slicing.

In some embodiments, the 3D rendering engine can be configured to transform a sensor data set by transforming only a portion of the sensor data set related to the slice of the sample.

In some embodiments, the 3D rendering engine can be configured to transform a sensor data set by transforming the extracted shape of the slice of the sample.

That is, it can be advantageous to transform only the "slice" captured on a sensor data set rather than transforming the whole sensor data set. For example, the "slices" (i.e. the portion of the sensor data capturing the slices) can be extracted from the sensor data sets and the rest of the sensor data set can be discarded. The 3D rendering engine can transform only the extracted slices. This can reduce the amount of data to be processed which can make the generation of the second 3D model more time efficient.

In some embodiments, the 3D rendering engine can be configured to calculate a slice similarity score between any pair of sensor data sets wherein the slice similarity score can indicate a similarity of the slices captured in the respective sensor data sets. That is, the slice similarity score can be a pairwise parameter that can be calculated for any pair of sensor data sets by comparing the two sensor data sets.

In some embodiments, the slice similarity score between the two sensor data sets can be configured to indicate a similarity of the shape of the slices that the two sensor data sets relate to.

That is, the slice similarity score calculated from two sensor data set can be configured to indicate the similarity of the shapes of the slices captured by the two sensor data sets. This can facilitate determining whether the slices can be subsequent slices. In other words, the slice similarity score can facilitate determining a correct order of the sensor data sets (and consequently of the slices).

In some embodiments, the slice similarity score between two sensor data sets can be calculated by comparing the extracted shape of the slices from the two sensor data sets.

In some embodiments, the slice similarity score can comprise an edge similarly score, configured to indicate a similarity between the edges of the slices.

In some embodiments, the slice similarity score can be a pairwise parameter calculated for any pair of sample data sets.

In some embodiments, the 3D rendering engine can be configured to calculate a global slice similarity score based on the pairwise slice similarity scores. This can be advantageous as it can facilitate determining the accuracy of an arrangement of all the sensor data sets (or slices) of the samples.

In some embodiments, the 3D rendering engine can be configured to generate the second 3D model by executing an iterative process.

In some embodiments, in each iteration the number of sensor data sets considered for generating the second 3D model can be increased. For example, the iterations may start with two sensor data sets, and after each iteration the number of sensor data sets can be increased. Thus, the second 3D model can be generated incrementally.

In some embodiments, in each iteration all the sensor data sets can be considered for generating the second 3D model.

In such embodiments, in each iteration a corresponding second 3D model can be generated. The 3D rendering engine can be configured to calculate in each iteration at least one slice similarity score, preferably a plurality of slice similarity scores, more preferably a corresponding slice similarity score between subsequent sensor data sets. The 3D rendering engine can be further configured to calculate in each iteration a global slice similarity score based on the pairwise slice similarity scores between subsequent slices. The 3D rendering engine can generate the second 3D model based on the 3D render model generated during the iteration with the maximum global slice similarity score or pairwise slice similarity score(s).

In some embodiments, the second 3D model can comprise a solid model of the sample.

In some embodiments, the second 3D model can comprise at least one cross sectional view of the sample, preferably a plurality of cross-sectional views of the sample.

In some embodiments, the second 3D model can comprise a representation of the outer shape of the sample, such as, a representation of the surface of the sample.

In a third embodiment the present invention discloses a system for generating a combined 3D model of a sample comprising. The system comprises a sample imaging system configured to generate a first 3D model of the sample according to any of the sample imaging system embodiments discussed above. The system according to the third embodiment, further comprises a slice imaging system configured to generate a second 3D model of the sample according to any of the slice imaging system embodiments. Further, the system according to the third embodiment comprises a combiner engine configured to generate a combined 3D model based on the first 3D model and the second 3D model of the sample.

That is, the system according to the third embodiment, can utilize the sample imaging system to acquire a plurality of sensor data related to a plurality of sides of the sample, via at least one sensor device of the sample imaging system. Furthermore, a data processing device comprised of the sample imaging system can be configured to process the plurality of sensor data acquired by the at least one sensor device to generate a first 3D model of the sample.

In other words, the sample imaging system can be configured to generate a first 3D model from sensor data of the whole sample. The first 3D model can comprise a shell or boundary model configured to represent the surface (or faces) of the sample. During the generation of the first 3D model by the sample imaging system, the sample can be as a whole. As such, the first 3D model can more accurately represent the general structure (or outer shape) of the sample.

In addition, the system according to the third embodiment, can utilize the slice imaging system to acquire a plurality of sensor data sets related to a plurality of slices of the sample, via a slice imaging device comprised by the slice imaging system. Furthermore, a 3D rendering engine comprised by the slice imaging system can be configured to process the plurality of sensor data sets to generate the second 3D model of the sample.

In other words, the slice imaging system can be configured to generate a second 3D model from sensor data of the slices of the sample. The second 3D model can comprise a solid model configured to represent the surface (or faces) of the sample and the internal structure (or cross-sectional views) of the sample. During the generation of the second 3D model by the slice imaging system, images of different cross-sections (i.e. slices) of the sample can be obtained. As such, the second 3D model can more accurately represent the internal structure (i.e. cross-sections) of the sample.

That is, the first 3D model can more accurately represent the outer shape of the sample, while lacking the modeling of the internal structure of the sample. In contrary, the second 3D model can accurately model the internal structure of the sample (through the cross-sectional views), however it may be less accurate on modeling the outer structure of the sample (as information regarding the general outer shape of the sample can be lost during the sectioning step and during dehydration of the sample). As such, the present technology further provides a combiner engine 90. The combiner engine can be configured to generate a combined 3D model based on the first 3D model and the second 3D model. More particularly, the combiner engine can extract general structure information (e.g. outer shape) from the first 3D model and internal structure information from the second 3D model and based on the extracted information generate the combined 3D model. As such, the system according to the third embodiment, in addition to the advantages of the sample imaging system and the advantages of the slice imaging system (according to the first and second embodiment of the present technology respectively) can be further advantageous as it can be configured to generate a combined 3D model of the sample, wherein the combined 3D model can inherit features of the first 3D model and the second 3D model. This can increase the accuracy by which the combined 3D model represents the sample.

In some embodiments, at least one sample change parameter may be utilized to facilitate the combining the first 3D model and the second 3D model to generate the combined 3D model. The sample change parameter can indicate a change of the physical and/or chemical structure of the sample that can be caused during the histological processing of the sample. The sample change parameter can comprise a shrinking parameter, color change parameter, shape change parameter that can indicate a change of the sample because of the histological processing before sectioning, particularly because of the dehydration step. That is, the sample may experience changes during the histological treatment. For example, the dehydration step can cause shrinkage, color and shape change to the sample. Information regarding the general outer shape of the sample can be lost during the sectioning step. As such, the first 3D model and the second 3D model may comprise some degree of difference between each other. The sample change parameters can be used to compensate for such a difference.

In some embodiments, the combiner engine can be configured to receive the first 3D model. That is, the combiner engine can receive the first 3D model already rendered or generated.

In some embodiments, the combiner engine can be configured to receive the second 3D model. That is, the combiner engine can receive the second 3D model already rendered or generated.

In some embodiments, the combiner engine can be configured to receive the sensor data sets acquired by the sample imaging system. That is, the combiner engine can be configured to receive sensor data sets related to a plurality of sides of the sample. In other words, the combine engine can be configured to receive a plurality of sensor data sets of the whole sample.

In some embodiments, the combiner engine can be configured to receive the sensor data sets acquired by the slice imaging system. That is, the combiner engine can be configured to receive a plurality of sensor data sets related to a plurality of slices of the sample.

In some embodiments, the combiner engine can be configured to extract general structure information related to the sample from the first 3D model. General structure information may relate to the outer shape of the sample. Said information can be utilized by the combiner engine to calculate a representation of the outer shape of the sample, for the generation of the combined 3D model.

In some embodiments, the combiner engine can be configured to extract general structure information related to the sample from the sensor data sets obtained by the sample imaging system.

In some embodiments, the general structure information can comprise the outer shape of the sample.

In some embodiments, the general structure information can comprise a mathematical representation of the surface of the sample. This can facilitate generating the combined 3D model comprising a mathematical representation of the surface of the sample.

In some embodiments, the combiner engine can be configured to extract cross-sectional structure information related to the sample from the second 3D mode.

In some embodiments, the combiner engine can be configured to extract cross-sectional structure information related to the sample from the sensor data sets obtained by the slice imaging system.

In some embodiments, the cross-sectional structure information can comprise a shape of the slices of the sample.

In some embodiments, the cross-sectional information can comprise a mathematical representation of the slices of the sample.

In some embodiments, the combiner engine can be configured to generate the combined 3D model by fitting the cross-sectional structure obtained from the second 3D model to the first 3D model.

In some embodiments, the combiner engine can be configured to calculate a matching score configured to indicate a fitness level of the cross-sectional structure (e.g. slices) on the first 3D model.

In some embodiments, the matching score can be calculated based on the fitness between the edges of the cross-sectional structure and the edges of the first 3D model.

In some embodiments, the combiner engine ca be configured to generate the combined 3D model by reconstructing the cross-sectional structure(s) (e.g. slices) obtained from the second 3D model based on the general structure obtained from the first 3D model.

In some embodiments, the combiner engine can be configured to generate the combined 3D model based on an image registration algorithm, wherein the sensor data sets of the slices of the sample obtained by the slice imaging system can be registered using the general structure information obtained from the sample imaging system as a reference.

In some embodiments, registering two sensor data sets can comprise bringing them into spatial alignment.

In some embodiments, the combined 3D model can comprise a representation of the surface of the sample.

In some embodiments, the combined 3D model can comprise at least one cross-sectional view of the sample, preferably a plurality of cross-sectional views of the sample.

In forth embodiment the present technology discloses a sample imaging method for generating a first three-dimensional model of a sample. The method comprised the step of acquiring a plurality of sensor data sets related to a plurality of sides of the sample via at least one sensor device. The method further comprises processing the plurality of sensor data sets via a data processing device to generate a first 3D model of the sample.

In some embodiments, the sample imaging method can be configured to operate the sample imaging system according to any of the preceding sample imaging system embodiments.

In a fifth embodiment, the present technology discloses a slice imaging method for generating a second three-dimensional model of a sample, the method comprises the step of acquiring a plurality of sensor data sets related to a plurality of slices of the sample via a slice imaging device. The method further comprises the step of processing the plurality of sensor data sets via a three-dimensional rendering engine to generate a second 3D model of the sample.

In some embodiments, the slice imaging method can be configured to operate the slice imaging system.

In a sixth embodiment, the present technology discloses a method for generating a combined 3D model of a sample. The method comprises the steps of acquiring a plurality of sensor data sets related to a plurality of sides of the sample via at least one sensor device and processing with a data processing device the sensor data sets related to a plurality of sides of the sample to extract general structure data related to the sample and acquiring a plurality of sensor data sets related to a plurality of slices of the sample via a slice imaging device and processing with a 3D rendering engine the sensor data sets related to a plurality of slices of the sample to extract cross-sectional data related to the sample and combining with a combiner engine the general structure data and the cross-sectional data to generate a combined 3D model of the sample.

In some embodiments, the method can be configured to operate the combined imaging system according to any of the combined imaging system embodiments.

Embodiments

Below, sample imaging system embodiments will be discussed. These embodiments are abbreviated by the letter "A" followed by a number. Whenever reference is herein made to sample imaging system embodiments, these embodiments are meant.

A1. A sample imaging system (1) for generating a first three-dimensional (3D) model of a sample (10), comprising:
at least one sensor device (50) configured to acquire a plurality of sensor data sets related to a plurality of sides of the sample (10);
a data processing device (20) configured to process the plurality of sensor data sets to generate a first 3D model (25) of the sample (10).

A2. The sample imaging system (1) according to any of the preceding sample imaging system embodiments, wherein the data processing device is configured to trigger the at least one sensor device to acquire at least one sensor data set.

Sample Positioning Device

A3. The sample imaging system (1) according to the preceding sample imaging system embodiment further comprising a sample positioning device (30) configured to move the sample (10), such that multiple sides of the sample (10) are positioned within the field of view of the at least one sensor device (50).

A4. The sample imaging system (1) according to the preceding sample imaging system embodiment, wherein the sample positioning device (30) is configured to rotate the sample (10) in a stepwise manner, wherein in each step the sample (10) is rotated by an angle of at most 180°, preferably at most 10°, such as 3.6°.

A5. The sample imaging system (1) according to any of the two preceding sample imaging system embodiments, wherein the sample positioning device (30) comprises a stepper motor and/or a push/pull actuator.

A6. The sample imaging system (1) according to any of the three preceding sample imaging system embodiments, wherein the data processing device (20) is configured to trigger the sample positioning device (30) to produce a motion of the sample (10).

A7. The sample imaging system (1) according to any of the four preceding sample imaging system embodiments, wherein the data processing device (20) is configured to trigger a rotation of the sample (10) and to provide an angle and/or direction of rotation to the motion generation system (30) and/or to trigger an up/down motion.

A8. The sample imaging system (1) according to any of the two preceding sample imaging system embodiments and with the features of embodiment A2, wherein the data processing device is configured to synchronize the triggering of the at least one sensor device (50) and the sample positioning device (30).

Sample Container

A9. The sample imaging system (1) according to any of the preceding sample imaging system embodiments, wherein the sample imaging system (1) is configured to generate a three-dimensional (3D) model of a sample (10) comprised in a sample container (100).

A10. The sample imaging system (1) according to the preceding sample imaging system embodiment, wherein the sample container (100) comprises a cavity surrounded by a body (13) comprising a base at the bottom and a free top-opening and a cap (11) configured to enclose said top-opening.

A11. The sample imaging system (1) according to the preceding sample imaging system embodiment, wherein the body (13) of the sample container (100) comprises a cylindrical shape.

A12. The sample imaging system (1) according to any of the two preceding sample imaging system embodiments, wherein the body (13) of the sample container (100) is composed of a transparent solid material.

A13. The sample imaging system (1) according to any of the three preceding sample imaging system embodiments, wherein the cap (11) of the sample container (100) comprises a non-circular cross-sectional shape, such as a n-edged cross-sectional shape, preferably an 8-edged cross-sectional shape.

A14. The sample imaging system (1) according to any of the four preceding sample imaging system embodiments, wherein the cap (11) is connected to the body (13) of the sample container (100) in a releasable manner.

A15. The sample imaging system (1) according to any of the five preceding sample imaging system embodiments, wherein the cavity of the sample container (100) is occupied with at least one sample (10) and with at least one fluid, preferably one of a preservation, a nurturing and a fixating fluid.

A16. The sample imaging system (1) according to any of the six preceding sample imaging system embodiments and with the features of embodiment A3, wherein the sample positioning device (30) is configured to generate a sudden motion of the sample container (100), such as, a motion that lasts at least 0.05 seconds and at most 5 seconds, and wherein the sudden motion can be a rotational and/or translational motion.

A17. The sample imaging system (1) according to the preceding sample imaging system embodiment, wherein the sample positioning device (30) is configured to generate the sudden motion of the sample container (100) at least once prior to the sensor device (50) capturing the plurality of sensor data sets.

A18. The sample imaging system (1) according to any of the two preceding sample imaging system embodiments, wherein the sample positioning device (30) is configured to induce a translational motion to the sample container (100), wherein the translational motion is induced by an actuator, such as, an electric, a pneumatic and a hydraulic actuator.

A19. The sample imaging system (1) according to any of the nine preceding sample imaging system embodiments, wherein the sample container (100) comprises at least one marker (12), such as 2 to 4 markers (12), preferably positioned in or on the cap (11) of the sample container (100).

A20. The sample imaging system (1) according to any of the ten preceding sample imaging system embodiments, wherein the sample container (100) comprises an identification label (15) configured to hold at least one information field for identification and/or automation purposes.

A21. The sample imaging system (1) according to the preceding sample imaging system embodiment, wherein the identification label (15) comprises at least one field configured to provide human and/or machine-readable information related to the sample and/or the liquid housed by the container and/or to the originator of the sample.

A22. The sample imaging system (1) according to any of the two preceding sample imaging system embodiments, wherein the identification label (15) comprises at least one field with an electronically readable information source, preferably a RFID chip.

A23. The sample imaging system (1) according to any of the three preceding sample imaging system embodiments, wherein the identification label (15) comprises at least one field, such as, a QR-code and/or a barcode, and wherein the data processing device (20) can be configured to detect the said field on at least one data set captured by the sensor device (50).

Container Base

A24. The sample imaging system (1) according to any of the preceding sample imaging system embodiments and with the features of embodiment A9, further comprising a container base (132) configured to receive at least one sample container (100).

A25. The sample imaging system (1) according to the preceding sample imaging system embodiment and with the features of embodiment A3, wherein the sample positioning device (30) is configured to transmit motion to the sample container (100) through the container base (132).

A26. The sample imaging system (1) according to any of the three preceding sample imaging system embodiments, wherein at least one sensor device (50) is attached on the container base (132), such that, the at least one sensor device (50) attached on the container base (132) comprises a field of view towards the bottom of the sample container (100).

Sensor Positioning Device

A27. The sample imaging system (1) according to any of the preceding sample imaging system embodiments further comprising a sensor positioning device (55) configured to handle or transport or move or rotate the at least one sensor device (50), such that the at least one sensor device (50) can be positioned in multiple poses relative to the at least one sample (10).

A28. The sample imaging system (1) according to any the preceding sample imaging system embodiments, wherein the sensor positioning device (55) is configured to position the at least one sensor device (50) in any point on the surface of at least one sphere with the center on or near the sample (10).

A29. The sample imaging system (1) according to any the two preceding sample imaging system embodiments, wherein the sensor positioning device (55) is configured to position the at least one sensor device (50) in any point on the surface of at least one cylinder with the central axis coinciding with the central vertical axis of the sample (10).

A30. The sample imaging system (1) according to any the three preceding sample imaging system embodiments, wherein the sensor positioning device (55) is configured to position the at least one sensor device (50) in any point of at least one circle with the center on or near the sample (10).

A31. The sample imaging system (1) according to any of the four preceding sample imaging system embodiments, wherein the sensor positioning device (55) comprises a stepper motor and/or a push/pull actuator.

Multiple Sensor Devices

A32. The sample imaging system (1) according to any of the preceding sample imaging system embodiments comprising a plurality of sensor devices (50) with different viewing angles toward the sample (10).

Sensor Types

A33. The sample imaging system (1) according to any of the preceding sample imaging system embodiments, wherein the at least one sensor device (50) comprises at least one visual sensor (50), such as, at least one camera (50) configured to capture images of the sample (10).

A34. The sample imaging system (1) according to the preceding sample imaging system embodiment, wherein the sensor data set comprises images of the sample (10).

A35. The sample imaging system (1) according to any of the preceding sample imaging system embodiments, wherein the at least one sensor device (50) comprises at least one depth sensor (50), such as, at least one time-of-flight sensor (50) and/or at least one stereo camera (50) configured to capture distance images of the sample (10).

A36. The sample imaging system (1) according to the preceding sample imaging system embodiment, wherein the sensor data set comprises distance images of the sample (10).

A37. The sample imaging system (1) according to any of the preceding sample imaging system embodiments, wherein the at least one sensor device (50) comprises at least one scanning device (50), such as, at least one laser scanning device (50), e.g., at least one LIDAR sensor (50), configured to scan the sample (10).

A38. The sample imaging system (1) according to the preceding sample imaging system embodiment, wherein the sensor data set comprises distance (or range) images of the sample (10).

A39. The sample imaging system (1) according to any of the preceding sample imaging system embodiments, wherein the at least one sensor device (50) comprises at least one ultrasound sensor (50) configured to obtain a graphical representation of the sample based on ultrasound measurements.

A40. The sample imaging system (1) according to the preceding sample imaging system embodiment, wherein the sensor data set comprises sonograms of the sample (10).

3D Rendering

A41. The sample imaging system (1) according to any of the preceding sample imaging system embodiments, wherein the data processing device (20) is configured to extract a side (i.e. a portion of the surface or face) of the sample (10) from a sensor data set.

A42. The sample imaging system (1) according to the preceding sample imaging system embodiment, wherein the data processing device (20) is configured to execute an edge detection algorithm on a sensor data set to extract a face of the sample (10).

A43. The sample imaging system (1) according to any of the two preceding sample imaging system embodiments, wherein the data processing device (20) is configured to execute a blob detection algorithm on a sensor data set to extract a face of the sample.

A44. The sample imaging system (1) according to any of the three preceding sample imaging system embodiments, wherein the data processing device (20) is configured to utilize a pre-trained deep learning architecture, such as, a deep convolutional neural network, to extract a face of the sample (10) from a sensor data set.

A45. The sample imaging system (1) according to any of the three preceding sample imaging system embodiments, wherein the data processing device (20) is configured to use image segmentation, to extract a face of the sample (10) from a sensor data set.

A46. The sample imaging system (1) according to any of the four preceding sample imaging system embodiments, wherein extracting a face of the sample comprises identifying a portion (or pixels) of the sensor data set related to the sample (10).

A47. The sample imaging system (1) according to any of the preceding sample imaging system embodiments, wherein the data processing device (20) receives for each sensor data set corresponding viewpoint data indicating the side of the sample (10) that the sensor data set relates to.

A48. The sample imaging system according to the preceding sample imaging system embodiment, wherein the data processing device (20) is configured to extract a plurality of sides of the sample (10) from the plurality of sensor data sets and to arrange the plurality of sides of the sample (10) based on the viewpoint data corresponding to each sensor data set for synthesizing or generating the first 3D model (25).

A49. The sample imaging system according to the preceding sample imaging system embodiment, wherein the data processing device (20) is configured to rotate, scale, move, skew the extracted sides of the sample (10) and join (or merge) a plurality of extracted sides during the generation of the first 3D model (25).

A50. The sample imaging system (1) according to any of the preceding sample imaging system embodiments, wherein the sensor data set comprises a graphical representation of a sample (10).

First 3D Model

A51. The sample imaging system (1) according to any of the preceding sample imaging system embodiments, wherein the first 3D model (25) comprises a shell (or boundary) model (25) representing the surface (or outer shape) of the sample (10).

A52. The sample imaging system (1) according to any of the preceding sample imaging system embodiments, wherein the first 3D model (25) comprises a mathematical representation of a plurality of surfaces or sides of the sample (10).

A53. The sample imaging system (1) according to any of the preceding sample imaging system embodiments, wherein the first 3D model (25) comprises a machine-readable representation of a plurality of surfaces or sides of the sample (10).

A54. The sample imaging system (1) according to any of the preceding sample imaging system embodiments, wherein the first 3D model (25) comprises virtual visual model of a plurality of surfaces or sides of the sample (10).

Type of Sample

A55. The sample imaging system (1) according to any of the preceding sample imaging system embodiments, wherein the sample (10) is at least one of a histological, pathological, forensic pathology, medical, biological, veterinary, agricultural tissue and/or biopsy sample.

Below, slice imaging system embodiments will be discussed. These embodiments are abbreviated by the letter "B" followed by a number. Whenever reference is herein made to slice imaging system embodiments, these embodiments are meant.

B1. A slice imaging system (2) configured to generate a second three-dimensional (3D) model (615) of a sample (10), comprising:
 a slice imaging device (610) configured to acquire a plurality of sensor data sets related to a plurality of slices of the sample (10);
 a three-dimensional rendering engine (620) configured to process the plurality of sensor data sets to generate a second 3D model (615) of the sample (10).

Slices of a Sample

B2. The slice imaging system (2) according to the preceding embodiment, configured to receive a plurality of slices of the sample (10), wherein a slice of a sample (10) is a cross section of a sample.

B3. The slice imaging system (2) according to any of the preceding slice imaging system embodiments, wherein a slice of a sample (10) comprises a thickness between 0.05 to 100 micrometers.

B4. The slice imaging system (2) according to any of the preceding slice imaging system embodiments, wherein a slice of a sample (10) is generated by cutting the sample (10) with a sectioning device (607) configured to cut thin slices of a material, such as, a microtome (607).

B5. The slice imaging system (2) according to the preceding embodiment, wherein the slice imaging system (2) comprises the sectioning device (607) and/or the slice imaging system (2) and the sectioning device (607) are integrated together.

B6. The slice imaging system (2) according to any of the preceding slice imaging system embodiments, wherein the slices of the sample (10) are stained slices.

B7. The slice imaging system (2) according to the preceding embodiment, wherein the slice imaging system (2) comprises a staining device configured to facilitate staining at least one slice of the sample (10).

B8. The slice imaging system (2) according to any of the preceding slice imaging system embodiments, wherein the slices of the sample (10) are de-wrinkled slices.

B9. The slice imaging system (2) according to the preceding embodiment, wherein the slice imaging system (2) comprises a de-wrinkling device configured to facilitate de-wrinkling at least one slice of the sample (10).

B10. The slice imaging system (2) according to any of the preceding slice imaging system embodiments, configured to receive the slices of the sample (10) attached to a slide (609).

B11. The slice imaging system (2) according to the preceding embodiment, wherein the slice imaging system (2) comprises a plurality of slides (609), each configured to facilitate attaching a slice of the sample (10) on a portion of the surface of the slide (609).

B12. The slice imaging system (2) according to any of the two preceding embodiments, wherein the plurality of slides (609) are microscope slides (609).

B13. The slice imaging system (2) according to any of the three preceding embodiments, wherein the slides (609) comprises a slide label section wherein a slide label is attached and/or stuck and/or written and/or printed and/or laser marked and/or laser engraved.

B14. The slice imaging system (2) according to the preceding embodiment, wherein the slide label comprises at least one field configured to provide human and/or machine-readable information related to the slice of the sample (10) attached to the corresponding slide (609).

B15. The slice imaging system (2) according to any of the two preceding embodiments, wherein the slide label comprises at least one field with an electronically readable information source, preferably a RFID chip.

B16. The slice imaging system (2) according to any of the three preceding embodiments, wherein the slide label comprises information related to the sample (10) and/or the slice of the sample (10) attached to the corresponding slide (609), such as, the thickness of the slice, the position of the slice on the sample (10) (e.g. a sequential number indicating the order of the slice), orientation of the slice.

B17. The slice imaging system (2) according to any of the preceding slice imaging system embodiments, wherein the slices of the sample (10) are generated by sectioning a sample (10) embedded in a hardening medium (602), such as, paraffin (602).

B18. The slice imaging system (2) according to any of the preceding slice imaging system embodiments, wherein the slices of the sample (10) are generated by sectioning a frozen sample (10).

B19. The slice imaging system (2) according to any of the preceding slice imaging system embodiment, wherein the slices of the sample (10) compose at least 5% of the sample (10), preferably at least 50% of the sample (10), even more preferably at least 80% of the sample (10).

B20. The slice imaging system (2) according to any of the preceding slice imaging system embodiments, wherein the slices of the sample (10) are uniformly distributed over the entire thickness of the sample (10).

B21. The slice imaging system (2) according to any of the preceding slice imaging system embodiments, wherein the slices of the sample (10) relate to a predefined portion of the sample (10).

Slice Imaging Device

B22. The slice imaging system (2) according to any of the preceding slice imaging system embodiments, wherein the slice imaging device (610) comprises at least one visual sensor (610), such as, at least one camera (610) configured to capture images of the slices of the sample (10).

B23. The slice imaging system (2) according to any of the preceding slice imaging system embodiments, wherein the slice imaging device (610) comprises at least one pathology scanner configured to capture an image of a slice of the sample (10).

B24. The slice imaging system (2) according to any of the preceding slice imaging system embodiments and with the features of embodiment B10, wherein the slice imaging device (610) comprises a pathology slide scanner (610) configured to capture an image of a slide (609) comprising a slice of the sample (10).

B25. The slice imaging system (2) according to any of the preceding slice imaging system embodiments, wherein the sensor data set comprises images of the slices of the sample (10).

B26. The slice imaging system (2) according to any of the preceding slice imaging system embodiments, wherein the slice imaging device (610) comprises a slice storage configured to receive and store a plurality of slices of the sample (10).

B27. The slice imaging system (2) according to any of the preceding slice imaging system embodiments, wherein the slice imaging device (610) is configured to automatically image a plurality of slices of the sample (10).

B28. The slice imaging system (2) according to any of the preceding slice imaging system embodiments, wherein the slice imaging device (610) is configured to simultaneously image a plurality of slices of one or more samples (10).

B29. The slice imaging system (2) according to any of the preceding slice imaging system embodiments, wherein the slice imaging device (610) is configured to capture magnified images of the slices of the sample (10).

B30. The slice imaging system (2) according to the preceding embodiment, wherein the magnification is between 2-60.

B31. The slice imaging system (2) according to any of the preceding slice imaging system embodiments and with the features of embodiments B10 and B13, wherein the slice imaging device (610) is configured to detect the slide label of the slide (609).

B32. The slice imaging system (2) according to the preceding embodiments, wherein the slice imaging device (610) is configured to extract information comprised on the slide label.

3D Rendering Based on Shape Slices

B33. The slice imaging system (2) according to any of the preceding slice imaging system embodiments, wherein the 3D rendering engine (620) is configured to receive the plurality of sensor data sets acquired by the slice imaging device (610).

B34. The slice imaging system (2) according to any of the preceding slice imaging system embodiments, wherein the 3D rendering engine (620) is configured to extract from each sensor data set the shape of the slice of the sample (10) captured therein.

B35. The slice imaging system (2) according to the preceding embodiment, wherein the 3D rendering engine (620) is configured to extract from each sensor data set the shape of the slice of the sample (10) captured therein by executing an edge detection algorithm on the sensor data set.

B36. The slice imaging system (2) according to any of the two preceding embodiments, wherein the 3D rendering engine (620) is configured to extract from each sensor data set the shape of the slice of the sample (10) captured therein by executing a blob detection algorithm on the sensor data set.

B37. The sample imaging system (1) according to any of the three preceding embodiments, wherein the 3D rendering engine (620) is configured to utilize a pre-trained deep learning architecture, such as, a deep convolutional neural network, to extract a slice of the sample (10) from a sensor data set.

B38. The sample imaging system (1) according to any of the four preceding sample imaging system embodiments, wherein the data processing device (20) is configured to use image segmentation, to extract a slice of the sample (10) from a sensor data set.

B39. The sample imaging system (1) according to any of the five preceding sample imaging system embodiments, wherein extracting a slice of the sample comprises identifying a portion (or pixels) of the sensor data set related to the sample (10).

B40. The slice imaging system (2) according to any of the six preceding embodiments, wherein the extracted shape of the slice of the sample (10) relates to the shape of a cross-section of the sample (10).

B41. The slice imaging system (2) according to any of the seven preceding embodiments, wherein the 3D rendering engine (620) is configured to generate the second 3D model (615) based on the extracted shape of the slices of the sample (10).

3D Rendering Based on Slice Features

B42. The slice imaging system (2) according to any of the preceding slice imaging system embodiments, wherein the 3D rendering engine (620) is configured to generate the second 3D model (615) based on additional information indicating features of the slices, such as, the thickness of the slices or the position of the slices on the sample (10) (i.e. the order of the slices) or the orientation of the slices relative to each other or any combination thereof.

B43. The slice imaging system (2) according to any of the preceding slice imaging system embodiments, wherein the 3D rendering engine (620) is configured to receive additional information indicating features of the slices, such as, the thickness of the slices or the position of the slices on the sample (10) (i.e. the order of the slices) or the orientation of the slices relative to each other or any combination thereof.

B44. The slice imaging system (2) according to any of the preceding slice imaging system embodiments, wherein the 3D rendering engine (620) is configured to receive the thickness of the slice, such as, the 3D rendering engine (620) is configured to read a slice thickness setting of a sectioning device (607), such as, a microtome (607), used to slice the sample (10).

B45. The slice imaging system (2) according to any of the two preceding embodiments and with the features of embodiment B31, wherein the 3D rendering engine (620) is configured to extract the slice thickness from the slide label.

B46. The slice imaging system (2) according to any of the three preceding embodiments, wherein the slice imaging system (2) further comprises a slice thickness measuring device configured to measure the thickness of a slice of the sample (10).

B47. The slice imaging system (2) according to the preceding embodiment, wherein the slice imaging system (2) is configured to maintain the orientation and/or ordering of the slices of the sample (10) unchanged until they are imaged by the slice imaging device (610).

B48. The slice imaging system (2) according to any of the preceding slice imaging system embodiments, wherein the 3D rendering engine (620) is configured to transform the sensor data sets.

B49. The slice imaging system (2) according to the preceding embodiment, wherein the 3D rendering engine (620) is configured to transform a sensor data set by re-ordering, moving, scaling, skewing, rotating, discarding the sensor data set or any combination thereof.

B50. The slice imaging system according to any of the two preceding embodiments, wherein the 3D rendering engine (620) is configured to transform a sensor data set by transforming only a portion of the sensor data set related to the slice of the sample (10).

B51. The slice imaging system according to any of the three preceding embodiments and with the features of embodiment B34, wherein the 3D rendering engine (620) is configured to transform a sensor data set by transforming the extracted shape of the slice of the sample (10).

Slice Similarity Score

B52. The slice imaging system (2) according to any of the preceding slice imaging system embodiments, wherein the 3D rendering engine (620) is configured to calculate an slice similarity score between any pair of sensor data sets wherein the slice similarity score indicates a similarity of the slices captured in the respective sensor data sets.

B53. The slice imaging system (2) according to the preceding embodiment, wherein the slice similarity score between two sensor data sets is configured to indicate a similarity of the shape of the slices that the two sensor data sets relate to.

B54. The slice imaging system (2) according to any of the two preceding embodiments and with the features of embodiment B34, wherein the slice similarity score between two sensor data sets is calculated by comparing the extracted shape of the slices from the two sensor data sets.

B55. The slice imaging system (2) according to any of the three preceding embodiments, wherein the slice similarity score comprises an edge similarly score, configured to indicate a similarity between the edges of the slices.

B56. The slice imaging system (2) according to any of the four preceding embodiments, wherein the slice similarity score is a pairwise parameter calculated for any pair of sample data sets.

B57. The slice imaging system (2) according to any of the five preceding embodiments, wherein the 3D rendering engine is configured to calculate a global slice similarity score based on the pairwise slice similarity scores.

Iterative Process

B58. The slice imaging system (2) according to any of the preceding slice system embodiments, wherein generating the second 3D model (615) is an iterative process.

B59. The slice imaging system (2) according to the preceding embodiments, wherein in each iteration the number of sensor data sets considered for generating the second 3D model (615) is increased.

B60. The slice imaging system (2) according to the penultimate embodiment, wherein in each iteration all the sensor data sets are considered for generating the second 3D model (615).

B61. The slice imaging system (2) according to the preceding embodiment, wherein in each iteration a corresponding second 3D model (615) is generated.

B62. The slice imaging system (2) according to any of the two preceding embodiments and with the features of embodiment B49, wherein in each iteration the 3D rendering engine calculates at least one slice similarity score, preferably a plurality of slice similarity scores, more preferably a corresponding slice similarity score between subsequent sensor data sets.

B63. The slice imaging system (2) according to the preceding embodiment, wherein the 3D rendering engine is further configured to calculate in each iteration a global slice similarity score based on the pairwise slice similarity scores between subsequent slices.

B64. The slice imaging system (2) according to any of the two preceding embodiments, wherein the 3D rendering engine generates the second 3D model (615) based on the 3D render model (615) generated during the iteration with the maximum global slice similarity score or pairwise slice similarity score(s).

Second 3D Model

B65. The slice imaging system (2) according to any of the preceding slice system embodiments, wherein the second 3D model (615) comprises a solid model of the sample (10).

B66. The slice imaging system (2) according to any of the preceding slice system embodiments, wherein the second 3D model (615) comprises at least one cross sectional view of the sample (10), preferably a plurality of cross-sectional views of the sample (10).

B67. The slice imaging system (2) according to any of the preceding slice system embodiments, wherein the second 3D model (615) comprises a representation of the outer shape of the sample (10), such as, a representation of the surface of the sample (10).

Below, combined imaging system embodiments will be discussed. These embodiments are abbreviated by the letter "C" followed by a number. Whenever reference is herein made to combined imaging system embodiments, these embodiments are meant.

C1. A system for generating a combined 3D model (95) of a sample (10) comprising:
- a sample imaging system (1) configured to generate a first 3D model (25) of the sample (10) according to any of the sample imaging system embodiments;
- a slice imaging system (2) configured to generate a second 3D model (615) of the sample (10) according to any of the slice imaging system embodiments;
- a combiner engine (90) configured to generate a combined 3D model (95) based on the first 3D model (25) and the second 3D model (615) of the sample (10).

C2. The system according to the preceding embodiment, wherein the combiner engine (90) is configured to receive the first 3D model (25).

C3. The system according to any of the preceding combined imaging system embodiments, wherein the combiner engine (90) is configured to receive the second 3D model (615).

C4. The system according to any of the preceding combined imaging system embodiments, wherein the combiner engine (90) is configured to receive the sensor data sets acquired by the sample imaging system (1).

C5. The system according to any of the preceding combined imaging system embodiments, wherein the combiner engine (90) is configured to receive the sensor data sets acquired by the slice imaging system (2).

C6. The system according to any of the preceding combined imaging system embodiments, wherein the combiner engine (90) is configured to extract general structure information related to the sample (10) from the first 3D mode (25).

C7. The system according to any of the preceding combined imaging system embodiments, wherein the combiner engine (90) is configured to extract general structure information related to the sample (10) from the sensor data sets obtained by the sample imaging system (1).

C8. The system according to any of the two preceding embodiments, wherein the general structure information comprises the outer shape of the sample (10).

C9. The system according to any of the three preceding embodiments, wherein the general structure information comprises a mathematical representation of the surface of the sample (10).

C10. The system according to any of the preceding combined imaging system embodiments, wherein the combiner engine (90) is configured to extract cross-sectional structure information related to the sample (10) from the second 3D mode (615).

C11. The system according to any of the preceding combined imaging system embodiments, wherein the combiner engine (90) is configured to extract cross-sectional structure information related to the sample (10) from the sensor data sets obtained by the slice imaging system (2).

C12. The system according to any of the two preceding embodiments, wherein the cross-sectional structure information comprises a shape of the slices of the sample (10).

C13. The system according to any of the three preceding embodiments, wherein the cross-sectional information comprises a mathematical representation of the slices of the sample (10).

C14. The system according to any of the preceding combined imaging system embodiments, wherein the combiner engine (90) is configured to generate the combined 3D model (95) by fitting the cross-sectional structure obtained from the second 3D model (615) to the first 3D model (25).

C15. The system according to the preceding embodiment, wherein the combiner engine (90) is configured to calculate a matching score configured to indicate a fitness level of the cross-sectional structure (e.g. slices) on the first 3D model (25).

C16. The system according to the preceding embodiment, wherein the matching score is calculated based on the fitness between the edges of the cross-sectional structure and the edges of the first 3D model (25).

C17. The system according to any of the preceding combined imaging system embodiments, wherein the combiner engine (90) is configured to generate the combined 3D model (95) by reconstructing the cross-sectional structure(s) (e.g. slices) obtained from the second 3D model (615) based on the general structure obtained from the first 3D model (25).

C18. The system according to the preceding embodiment, wherein the combiner engine (90) is configured to generate the combined 3D model (95) based on an image registration algorithm, wherein the sensor data sets of the slices of the sample (10) obtained by the slice imaging system (2) are registered using the general structure information obtained from the sample imaging system (1) as a reference.

C19. The system according to the preceding embodiment, wherein registering two sensor data sets comprises bringing them into spatial alignment.

C20. The system according to any of the preceding combined system embodiments, wherein the combined 3D model comprises a representation of the surface of the sample (10).

C21. The system according to any of the preceding combined system embodiments, wherein the combined 3D model (95) comprises at least one cross sectional view of the sample (10), preferably a plurality of cross-sectional views of the sample (10).

Below, sample imaging method embodiments will be discussed. These embodiments are abbreviated by the letter "D" followed by a number. Whenever reference is herein made to sample imaging method embodiments, these embodiments are meant.

D1. A sample imaging method for generating a first three-dimensional (3D) model of a sample (10), the method comprising the steps of:
  a. acquiring a plurality of sensor data sets related to a plurality of sides of the sample (10) via at least one sensor device (50);
  b. processing the plurality of sensor data sets via a data processing device (20) to generate a first 3D model (25) of the sample (10).

D2. The method according to the preceding embodiments, configured to operate the sample imaging system (1) according to any of the preceding sample imaging system embodiments.

Below, slice imaging method embodiments will be discussed. These embodiments are abbreviated by the letter "E" followed by a number. Whenever reference is herein made to slice imaging method embodiments, these embodiments are meant.

E1. A slice imaging method for generating a second three-dimensional model of a sample (10), the method comprising the steps of:
  a. acquiring a plurality of sensor data sets related to a plurality of slices of the sample (10) via a slice imaging device (610);
  b. processing the plurality of sensor data sets via a three-dimensional rendering engine (620) to generate a second 3D model (615) of the sample (10).

E2. The slice imaging method according to the preceding embodiment, the method configured to operate the slice imaging system (2).

Below, combined method embodiments will be discussed. These embodiments are abbreviated by the letter "F" followed by a number. Whenever reference is herein made to combined method embodiments, these embodiments are meant.

F1. A method for generating a combined 3D model of a sample (10), the method comprising the steps of:
  a. acquiring a plurality of sensor data sets related to a plurality of sides of the sample (10) via at least one sensor device (50);
  b. processing with a data processing device (20) the sensor data sets related to a plurality of sides of the sample (10) to extract general structure data related to the sample (10);
  c. acquiring a plurality of sensor data sets related to a plurality of slices of the sample (10) via a slice imaging device (610);
  d. processing with a 3D rendering engine (620) the sensor data sets related to a plurality of slices of the sample (10) to extract cross-sectional data related to the sample (10);
  e. combining with a combiner engine (90) the general structure data and the cross-sectional data to generate a combined 3D model of the sample (10).

F2. The method according to the preceding embodiment, the method configured to operate the combined imaging system according to any of the preceding combined imaging system embodiments.

DETAILED DESCRIPTION OF THE FIGURES

In the following, exemplary embodiments of the invention will be described, referring to the figures. These examples are provided to give further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps can be present between some or all of the described steps.

Embodiments of present technology generally relate to imaging and generating three-dimensional models of samples (interchangeably referred to as specimen, or tissue), which can be histological, pathological, forensic pathology, medical, biological, veterinary, agricultural tissue and/or biopsy sample. Such samples are generally treated in the fields of histology, histopathology, anatomical pathology, forensic pathology and/or surgical pathology. Histology is a branch of biology which studies the microscopic anatomy of biological tissues (or samples). Pathology is a branch of medical science that involves the study and diagnosis of disease through the examination of surgically removed organs, tissues (biopsy samples), bodily fluids, and in some cases the whole body (autopsy). Histopathology is a branch of histology that studies the changes in tissue caused by disease. Anatomical pathology is a medical branch that deals with the diagnosis of disease based on examinations of organs and tissues. Forensic pathology is pathology that focuses on determining the cause of death by examining a corpse or samples obtained from the corpse. Surgical pathology is the study of tissues removed from living patients during surgery. The above terms are used throughout this text and embody the meaning as commonly used in the art and as generally defined above.

Figure 1:
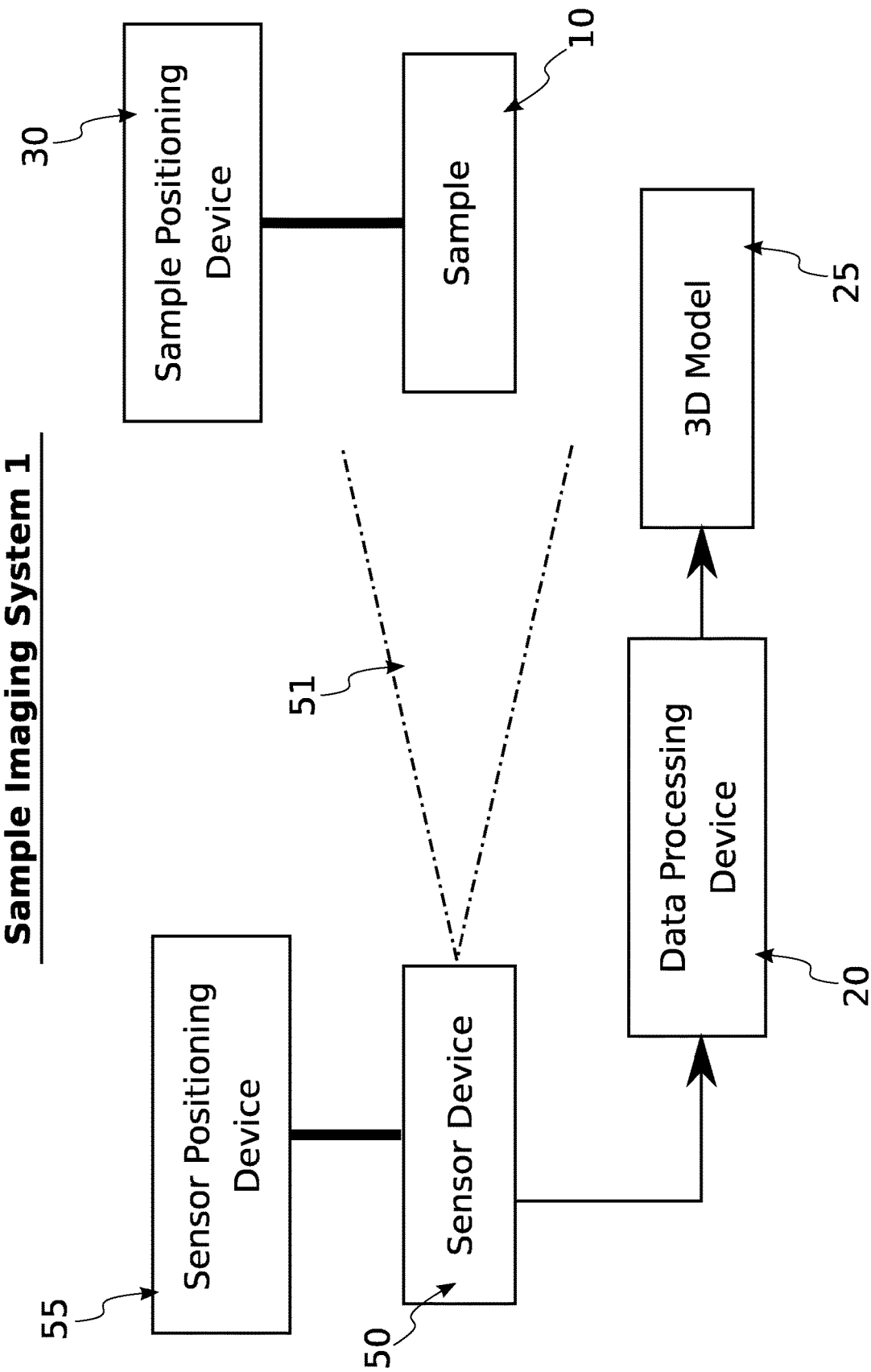
FIG. 1 depicts a general schematic of a sample imaging system configured to acquire sensor data related to a sample via at least one sensor device and to generate a computerized three-dimensional model of the sample.

FIG. 1 schematically and generally illustrates a sample imaging system 1. The sample imaging system 1 can be configured for obtaining sensor data (i.e. imaging) the surface of at least one sample 10. The at least one sample 10 may be a specimen, such as at least one of histological, pathological, forensic pathology, medical, biological, veterinary, agricultural tissue and/or biopsy samples. The at least one sample 10 can be provided in containers (e.g. sample container 100, see FIG. 2), cassettes, embedded in a hardening medium (e.g. wax), frozen, etc.

The sample imaging system 1 can comprise a sensor device 50. The sensor device 50 can comprise at least one visual camera 50 (e.g. visual camera), at least one depth sensor 50 (e.g. ToF sensor, stereo camera), at least one scanning device 50 (e.g. LIDAR), at least one ultrasound sensor 50 and/or or any other sensor or imaging device 50 which does not change the general principle of the invention. It will be understood that the above list only provides some illustrative sensor devices 50 that can be comprised by the sample imaging system 1. The sensor device 50 can be configured to facilitate obtaining sensor data related to the at least one sample 10. More particularly, the sensor device 50 can be configured to obtain sensor data related to the surface (or shell or faces) of the at least one sample 10. Thus, the sensor device 50 and the at least one sample 10 can be positioned or arranged such that the at least one sample 10 can be on the field of view 51 of the sensor device 50. Preferably, the sensor device 50 and/or the at least one sample 10 can be handled such that different arrangements between the at least one sample 10 and the sensor device 50 can be realized, wherein in each arrangement a corresponding face or surface or side of the sample 10 can be imaged (i.e. sensor data can be obtained) by the sensor device 50.

The sample imaging system 1 can comprise a sensor positioning device 55. The sensor positioning device 50 can be configured to facilitate mounting the sensor device 50 therein. That is, one or more components or sensors of the sensor device 50 can be attached or mounted (releasably or non-releasably) to the sensor positioning device 55. Additionally, the sensor positioning device 55 can be configured to handle the sensor device 50. More particularly, the sensor positioning device 55 can be configured to handle or transport or move or rotate the sensor device 50, such that the sensor device 50 can be positioned in multiple poses relative to the at least one sample 10. This can allow the sensor device 50 to obtain sensor data of the sample 10 from multiple viewpoints or viewing angles. In other words, the sensor positioning device 55 can facilitate arranging the sensor device 55 relative to sample 10, such that the sensor device 50 may image (i.e. obtain sensor data related to) different sides or faces or surface portions of the sample 10.

Alternatively, or additionally (to the sensor positioning device 55), the sample imaging system 1 can comprise a sample positioning device 30. The sample positioning device 30 can be configured to facilitate receiving at least one sample 10. For example, the sample positioning device may comprise or be attached to a sample base 132 (see FIG. 2) configured to facilitate receiving at least one sample 10. In addition, the sample positioning device 30 can be configured to handle the at least one sample 10. More particularly, the sample positioning device 30 can be configured to handle or transport or move or rotate the at least one sample 10, such that the at least one sample 10 can show different of its faces to the sensor device 50. This can allow the sensor device 50 to obtain sensor data of multiple surfaces or faces of the at least one sample 10.

In some embodiments, both the sensor positioning device 50 and the sample positioning device 30 can be provided. This can facilitate obtaining sensor data from multiple sides of the at least one sample 10. For example, the number of viewing angles of the sensor device 50 towards the sample 10 and/or the amount of surface of the at least one sample 10 that can be sensed or imaged by the sensor device 50 can be increased.

The sample imaging system 1 can further comprise a data processing device 20. The data processing device 20 can comprise a three-dimensional (3D) rendering engine 20 and/or can be configured for 3D rendering. That is, the data processing device 20 can be configured to generate a computerized 3D model 25 of the at least one sample 10 based on the sensor data obtained by the sensor device 50. In other words, using sensor data related to multiple faces of the sample 10, a 3D model 25 of the sample 10 can be generated by the data processing device. In this regard, it can be advantageous to obtain sensor data related to multiple faces or sides of the sample 10 and/or from multiple viewing angles towards the sample 10.

The 3D model 25 can comprise a shell model 25 or a boundary model 25. That is, the 3D model 25 can represent the surface (i.e. shell, boundary, outer shape) of the sample 10. The 3D model 25 generated by the sample imaging system 1 can be referred as a first 3D model 25. This is done to differentiate from other 3D models that can be generated by other aspects of the present invention that will be discussed later in the description.

With respect to FIGS. 2-6, a more detailed discussion regarding the sample imaging system 1 follows.

Figure 2:
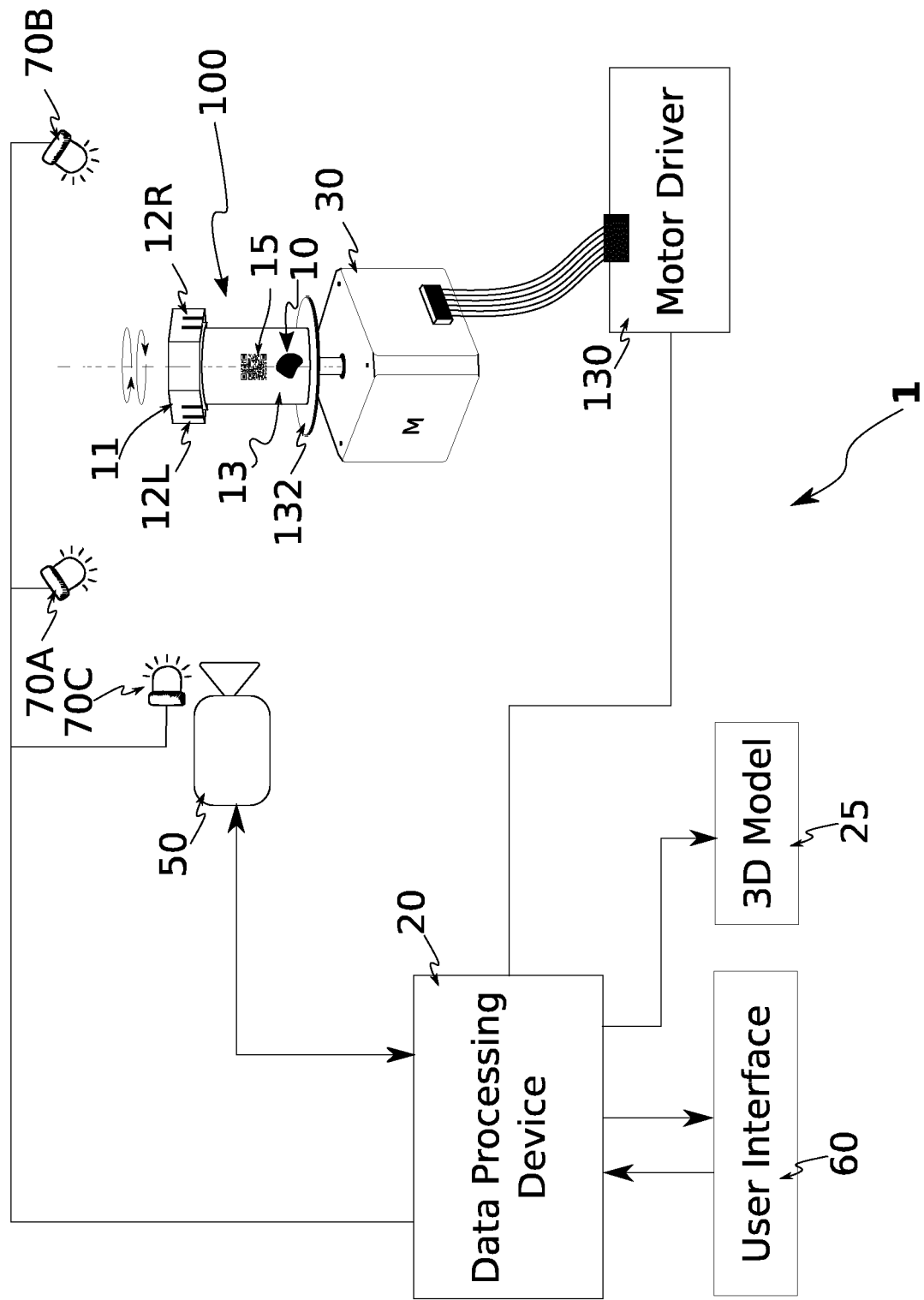
FIG. 2 depicts a schematic of a first embodiment of the sample imaging system.

FIG. 2 provides a more detailed schematic of an embodiment of the sample imaging system 1 configured to acquire sensor data related to at least one sample 10 contained in a sample container 100, via at least one sensor device 50. The sensor data can relate to the entire sample container 100 or to a part of a sample container 100. Furthermore, the sample imaging system 1 can be configured to generate a computerized three-dimensional (3D) model 25 of a field of view of the at least one sensor 50, preferably of the sample container 100, even more preferable of at least one sample 10 comprised in the sample container 100. For the sake of brevity, the term 3D model 25 will be used to refer to a computerized three-dimensional (3D) model 25 of a field of view of the at least one sensor 50, preferably of the sample container 100, even more preferable of at least one sample 10 comprised in the sample container 100. The 3D model 25 can comprise a mathematical representation (or a machine-readable representation) of a plurality of surfaces of an object, preferably of all the surfaces (or faces) of the object. The mathematical representation of the plurality of the surfaces of an object can comprise a mathematical representation that can estimate each of the plurality of surfaces of an object and their relative position with each other. To put it in simple words, the 3D model 25 may comprise an estimation or representation of a shape of an object according to the three physical dimensions. The 3D model 25 can comprise a shell model 25 or a boundary model 25 of the at least one sample 10. Furthermore, the 3D model 25 can be displayed in or can comprise a visual format (i.e. human readable).

In general, the sample imaging system 1 can be configured to collect a plurality of sensor data sets regarding the sample container 100 and the at least one sample 10 in the sample container 100 using at least one sensor device 50. The plurality of the sensor data sets can preferably be acquired for different sides (or faces) of the sample container 100 and of the at least one sample 10. Thus, the sample imaging system 1 can be configured to acquire sensor data from different sides of the sample container 100 and the at least one sample 10 contained therein. The sample imaging system 1 can comprise different configurations that can allow acquiring sensor data from different sides of the sample container 100 and the at least one sample 10 contained therein.

Throughout the text whenever describing acquiring (or obtaining) sensor data related to the sample container 100, acquiring sensor data related to the sample container 100 and the at least one sample 10 contained in the sample container 100 is meant. Furthermore, the terms imaging, obtaining sensor data and acquiring sensor data are used interchangeably. Throughout the text the term sensor data generally refers to the data that the sensor device 50 can be configured to measure. For example, for a camera 50 the sensor data comprise color information (i.e. visual features) related to the field of view of the camera 50, for a time-of-flight (ToF) sensor 50 the sensor data comprise distance information (i.e. depth features) related to the field of view of the ToF sensor 50. Furthermore, the term sensor data set is used to generally refer to the data that can be output by a sensor device 50 after the sensor device 50 performs a measurement (or capture, or sensing). For example, for a camera 50 the sensor data set can comprise at least one color image, for a ToF sensor 50 the sensor data set can comprise a distance image.

Thus, the sample imaging system 1 can be configured to acquire a respective sensor data set for each of a plurality of sides of the sample container 100. Furthermore, the sample imaging system 1 can be configured to generate a 3D model of the sample container 100 based on the plurality of captured sensor data sets.

A sample container 100, that can also be referred to as a specimen container 100, can be provided to the sample imaging system 1. The sample container 100 can comprise a cavity that can be filled by at least one sample 10 (also referred to as specimen 10), such as at least one of histological, pathological, medical, biological, forensic pathology, veterinary, agricultural tissue and/or biopsy samples 10. Additionally, the cavity of the sample container 100 can be partially or fully filled with a specimen preservation liquid, such as formalin, to prevent the at least one specimen 10 from decaying. For example, the cavity of a sample container 100 can be filled with at least one tissue sample and formalin. Generally, the sample or specimen 10 is a solid, in contrast to the preservation liquid which is a liquid.

The cavity of the sample container 100 can be surrounded on the lateral sides (i.e. side walls) and on the base (i.e. bottom) by a body 13. That is, the body 13 encloses the cavity wherein specimens 10 can be put. In other words, the body 13 can comprise a shape such that an empty volume can be surrounded by the body on all the sides except for one. That is, the body 13 can comprise a top opening that can allow specimens 10 and fixation liquids to be put on the cavity of the sample container 100.

The top opening of the body 13 can be enclosed by a cap 11. The cap 11 can be configured to enclose the cavity of the sample container to prevent the specimens 10 and/or liquids inside the sample container 100 to escape the cavity of the sample container 100 and to prevent external material from entering in the cavity of the sample container 100. The cap 11 can assume or can be positioned in a closed position, thus, enclosing the body 13 of the sample container 100, more specifically enclosing the top-opening of the body 13 of the sample container 100. Additionally, the cap 11 can assume or can be positioned in an open position, thus, providing a free top-opening of the body 13 of the sample container 100—which can allow for the insertion and/or extraction of the specimen(s) 10 and/or preservation materials on the sample container 100. In some embodiments, the cap 11 under the exertion of a force can go from the open position to the closed position and from the closed position to the open position more than one time—thus, allowing for the opening and closing of the sample container 100 multiple times without damaging, e.g. breaking, the structure of the sample container 100 and/or the cap 11. Put simply, in some embodiments, the cap 11 can be detachably (i.e. releasably) attached to the sample container 100.

In some embodiments, the cap 11 can selectively allow either the preservation liquid or the specimen 10 or both to be inserted and/or extracted (i.e. removed) from the cavity of the sample container 100. For example, the cap 11 can comprise a filtering structure (not shown) configured like a net. The filtering structure can be configured to allow the liquid to tunnel (or pass) through the filtering structure, while blocking the passage of the specimens 10. The cap 11 can further comprise a blocking structure, which blocks the passage of the specimen 10 and the liquid through it. Both the filtering and the blocking structure can be releasably or un-releasably attached to the body 13 of the specimen container 100 and with each other. Hence, the top opening of the sample container 100 can be enclosed either with the filtering structure or the blocking structure or both. Further, different filtering structures can be provided that can be configured for different structures and sizes of the specimens 10—i.e. for small specimens 10 filtering structures with small "holes" can be provided. Further still, multiple filtering structures can be provided to the cap 11, allowing the configuration of different filter sizes.

To put it in simple words, the sample container 100 can be opened and/or closed at least one time, preferably multiple times. In one embodiment, the cap 11 can be pushed towards the body 13 of the sample container 100—thus being arranged into the closed position. Additionally, or alternatively the cap 11 can be pulled from the body 13 of the sample container 100 thus being arranged into the open position. The closing and/or opening of the sample container 100 by putting the cap 11 in a closed or opened position can be facilitated by the use of threads in the sample container 100 and the cap 11. Thus, the cap 11 can close or open the sample container 100 by applying torque onto the cap 11 and/or the sample container 100 (i.e. rotating the cap 11 relative to the sample container 100).

In addition, the sample container 100 can comprise at least one identification label 15. The identification label 15 may comprise an optical label 15. The identification label 15 may comprise any machine-readable code, such as (but not limited to), a barcode, a QR code, a standardized font set like OCR and/or a human readable information. The identification label 15 may additionally or alternatively comprise an RFID tag or any device, apparatus or assembly of devices configured for near field communication. The identification label 15 may comprise a unique registration number of the sample container 100 which can later be correlated to a specimen 10. Alternatively, or additionally, the identification label can comprise information regarding the number of specimens 10 in the sample container 100, the size of specimens 10 in the sample container 100, a data when the samples were obtainer, a duration the samples have been put in the fixation liquid, or a combination thereof. Further, the identification label 15 may comprise information about the type of specimen 10 and/or of a reference for billing and/or identification purposes.

The sample imaging system 1 can be configured to automatically detect and read the identification label 15 of the sample container 100. The sample imaging system 1 can be configured to identify an advantageous orientation of the sample container 100 such that it can detect and read the identification label 15. The advantageous orientation of the sample container 100 may, for example, be one wherein the identification label can be imaged by the sensor device 50 or by a label reader (not shown). Thus, the sample imaging system 1 can be configured to rotate the sample container 100 while identifying the advantageous orientation. The identification of the advantageous orientation can be facilitated by measuring the diameter of the cap 11, wherein the cap 11 can be configured such that it can comprise a corresponding dimeter when imaged while the sample container 100 is on the advantageous orientation. The diameter of the cap 11 can be measured based on a line profile operation. Alternatively, or additionally, the identification of the advantageous orientation of the sample container 100 can be facilitated by one or more markers 12L, 12R (e.g. optical markers 12L, 12R), which indicate the advantageous orientation. A method for detecting an advantageous orientation of a sample container 100 is disclosed in the European patent application EP18162225.9, which is hereby incorporated by reference.

The sample imaging system 1, can further comprise a container base 132. The container base 132 can be a flat surface, such as, a plate shaped surface, wherein the sample container 100 can be provided to the sample imaging system 1. In some embodiments, the sample container 100 can be placed on the container base 132 such that the base of the sample container 100 contacts the container base 132 (as depicted in FIG. 2). The container base 132, more particularly the surface of the container base 132 contacting the sample container 100 can be configured to increase the friction between the said surface of the container base 132 and the sample container 100. For example, the surface of the container base 132 can comprise (e.g. can be coated) with a sticking material wherein the container base 132 can be stuck when placed in the container base 132, preferably in a releasable manner.

Figure 3:
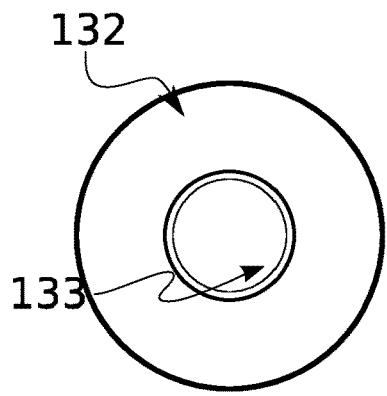
FIG. 3 depicts different embodiments of a container base that can be comprised by the sample imaging system configured to receive a sample in a sample container.
Figure 3:
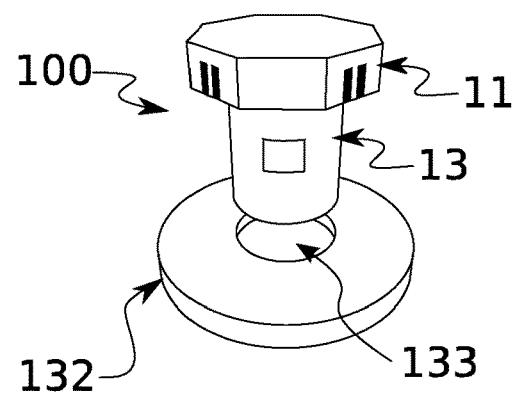
Figure 3:
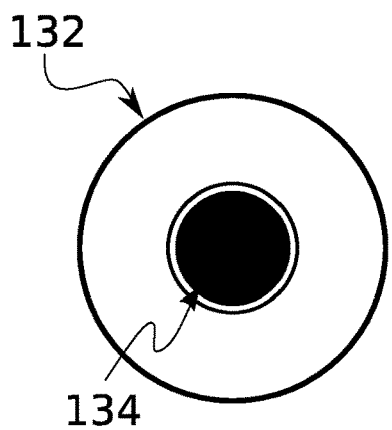
Figure 3:
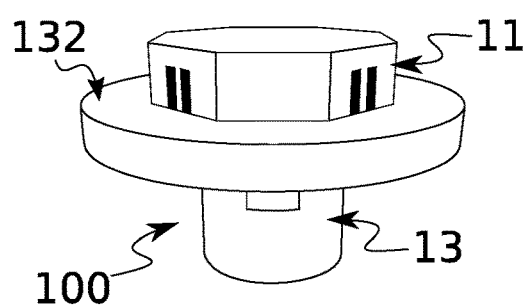
Figure 3:
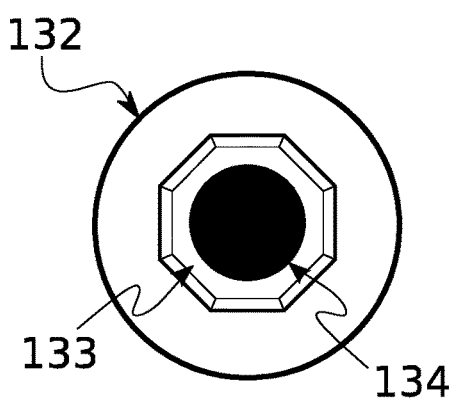
Figure 3:
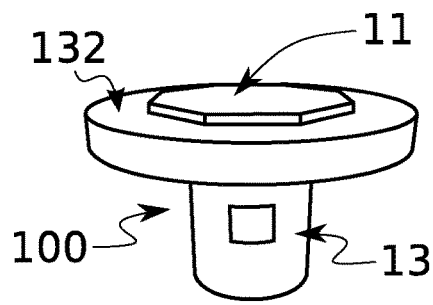

FIG. 3 depicts some further exemplary embodiments of the container base 132. As shown in FIG. 3a, in some embodiments the container base 132 can comprise an engraved section 133 configured to receive the sample container 100, more particularly a portion of the body 13 of the sample container 100. The engraved section 132 can comprise a shape similar to the base of the sample container 100 such that a portion of the body 13 can snuggly fit in the engraved section of the container base 132. This can facilitate the fixation of the sample container 100 in the container base 132 (which can further facilitate supporting and/or handling the sample container 100).

Alternatively, as shown in FIG. 3b, the container base 132 can comprise a hollow structure, more particularly it can comprise a container receiving hole 134. The container receiving hole 134 can be configured to receive the sample container 100. More particularly, a portion of the body 13 of the sample container 100 can be inserted through the container receiving hole 134. For example, the container receiving hole 134 can allow the body 13 to pass through it, however it may not allow the cap 11. That is, the cap 11 can comprise a dimeter that can be larger than the body 13 and the container receiving hole 134 can comprise a diameter slightly bigger than the body 13, but smaller than the cap 11. Thus, the body 13 can snuggly fit on the container receiving hole 134 which can facilitate a fixation of the sample container 100 in the container base 132 (which can further facilitate supporting and/or handling the sample container 100).

Alternatively, as shown in FIG. 3c, the container base 132 can comprise an engraved section 133 and a container receiving hole 134. The container receiving hole 134 can be provided in the engraved section 133 and can be configured to allow only the body 13 of the sample container 100 to pass through (as discussed above). The engraved section 133 can be configured to receive the cap 11 of the sample container 100. For example, the engraved section can comprise a similar or identical shape to the cap 11 with a size slightly bigger than the cap 11, to allow a snuggle fit of the cap 11 on the engraved section 133. As such, the sample container 100 can be provided to the container base 132 by sliding the body 13 of the sample container 100 through the container receiving hole 134 until the cap 11 of the sample container 100 is fitted on the engraved section 133.

Alternatively still, the container base 132 can comprise an enclosed volume (not shown). The sample container 100, particularly the body 13 of the sample container 100 can be received in the said enclosed volume. For example, the container base 132 can comprise the container receiving hole or the container receiving hole combined with the engraved section (as discussed above), that can allow the sample container 100 or the body 13 to be inserted in the enclosed volume. Additionally, the enclosed volume can comprise an opening that can allow the sensor 50 (see FIG. 2) to "see" the sample container 100 provided therein. Alternatively, the camera 50 can be provided inside the enclosed volume of the container base 132. The enclosed volume can be advantageous as it can allow for a better control of the conditions of the environment wherein the sensor data related to the sample container 100 can be obtained. Such conditions may comprise lighting, background color, temperature, humidity, cleanliness (from dust), etc., which can influence the quality of the obtained sensor data.

Referring back to FIG. 2, the container base 132 can be attached to a sample positioning device 30, which can also be referred to as a motion generator apparatus 30. In FIG. 2, the container base 132 and the motion generator apparatus 30 are depicted as being directly connected to each other. However, it will be understood that the container base 132 and motion generator apparatus 30 may also be indirectly connected through a motion transmission system (not shown) that can transmit rotary and/or translational motion from the motion generator apparatus 30 to the container base 132.

The motion generator apparatus 30 can be configured to generate or provide motion, which can be transmitted to the container base 132 and to the sample container 100 (if positioned in or on the container base 132). The motion generator apparatus 30 can convert or transform one form of energy, such as but not limited to electrical, magnetic, thermal, chemical, elastic, mechanical into kinetic energy. Thus, the motion generator apparatus 30 can provide rotary motion of the container base 132 and thus, the sample container 100, when sample container 100 is put on the container base 132. Additionally, or alternatively, the motion generator apparatus 30 can provide translational motion of the container base 132 and the sample container 100. For example, the motion generator apparatus 30 can move the sample container in a vertical (i.e. longitudinal) direction (e.g. push and/or pull) and/or in at least one horizontal direction (e.g. left and/or right and/or back and/or forth). Note, that the vertical (i.e. longitudinal) direction herein can represent the direction according to the vertical central axis of the sample container 100 (provided with dashed lines in FIG. 2), wherein the vertical central axis can be perpendicular to the top opening of the sample container 100 and/or to the base of the sample container 100 and/or to the surface of the container base 132. The horizontal direction can represent the direction according to any straight line perpendicular to the vertical central axis.

The motion generator apparatus 30 can be a motor 30, such as a stepper motor 30. For text simplicity, the motion generator apparatus 30 may be referred throughout the text as a motor 30. In the system of FIG. 2 further a motor driver 130 can be provided. The motor driver 130 can be configured for providing the required power and/or control signals, such as direction of movement and/or angle of movement, for driving the motor 30. The motor driver 130 and the motor 30 can thus be connected by a plurality of wires that can transmit the required power and/or control signals from the motor driver 130 to the motor 30.

The sample imaging system 1 can further comprise a data processing device 20. The data processing device 20 can provide the required control signals to the motor 30 either directly or via a motor driver 130 as depicted in FIG. 2. That is, the data processing device 20 can "control" the motor 30. For example, the data processing device 20 can signal the motor 30, through the wire connections that connect the data processing device 20 with the motor 30 either directly or via the motor driver 130, to rotate in a clock-wise direction stepwise, e.g., by 3.6 degrees. In other words, the data processing device 30 can control the motor 30 to produce movement of the container base 132, such as a movement in a certain direction with a certain angle by providing through a set of control signals the direction and/or the angle of required movement.

The data processing device 20 can comprise means of data processing, such as, (a) processor unit(s), graphical processor unit(s), hardware accelerator(s) and/or microcontroller(s). The data processing device 20 can comprise memory components, such as, main memory (e.g. RAM), cache memory (e.g. SRAM) and/or secondary memory (e.g. HDD, SDD). The data processing device 20 can comprise busses configured to facilitate data exchange between components of the data processing device 20, such as, the communication between the memory components and the processing components.

In other words, the data processing device 20 can be a processing unit configured to carry out instructions of a program (i.e. computer-implemented method). The data processing device 20 can comprise an image processing unit configured to execute at least one image processing algorithm. The data processing device 20 can comprise a 3D rendering engine or unit 20 configured to render or generate 3D models from sensor data sets. The data processing device 20 can be a system-on-chip comprising processing units, memory components and busses. In some embodiments, the data processing device 20 can be an embedded system. In some embodiments, the data processing device 20 can comprise a server, such as, a cloud server.

Further, the sample imaging system 1 can comprise at least one sensor device 50 (which for the sake of brevity can also be referred to as sensor 50). The sensor device 50 can be configured to sense (i.e. detect a feature) in its environment (i.e. in the field of view of the sensor device 50). The sensor device 50 can be configured to sense or detect a feature of the sample container 100. In other words, the sensor device 50 can be used to acquire sensor data related to the sample container 100 and preferably related to the samples contained in the sample container 100. Thus, it can be advantageous to adjust the position of the sensor device 50 and/or the container base 132 and/or the sample container 100, such that, the sample container 100 can be within the field of view of the camera 50.

FIG. 2 depicts the sensor device 50 with a field of view towards the lateral surface of the sample container 100. The sample container 100 can be rotated by the sample positioning device 30 (or motor 30) which can facilitate capturing multiple sensor data sets related to the lateral surface of the sample container 100, and particularly of the at least one sample 10 in the sample container 100. Alternatively, or additionally, a sensor device 50 can provided in the longitudinal direction—i.e. with a field of view towards the top and/or bottom of the sample container 100. For example, a sensor device 50 (e.g. an ultrasound sensor 50) can be provided with a field of view towards the bottom of the sample container 100. In some embodiments, at least one sensor device 50 can be provided in the container base 132, such as, on the engraved section 133 of the container base 132.

The sensor device 50 can be connected with the data processing device 20. The data processing device 20 can trigger the sensor device 50 to acquire sensor data, which sensor data can be related to the sample container 100 and more particularly to the at least one sample 10 in the sample container 100. That is, the data processing device 20 can provide a triggering signal to the sensor device 50 which triggers the sensor device 50 to capture sensor data. For example, the data processing device 20 can provide to the sensor device 50 a plurality of timed triggering signal pulses (a pulse is a transition of the signal from a high voltage, i.e. state "1" to a low voltage, i.e. state "0", which can also be referred as rising edge, and the opposite, which can also be referred as falling edge) that can trigger the sensor device 50 to capture at least one set of sensor data—e.g. each pulse (rising edge or falling edge or both) can trigger the capturing of a single sensor data set. The sensor data obtained by the sensor device 50 can be stored in a memory location within the sensor device 50 and/or can be transferred in a memory location external to the sensor device 50. It can be advantageous, that the memory location wherein the sensor device 50 can store the sensor data, can be accessed by the data processing device 20. This can allow the data processing device 20 to process the at least one set of sensor data.

Furthermore, it can be advantageous that the data processing device 20 can synchronously control the motor 30 and the sensor device 50 (and/or the sensor positioning device 55, see FIG. 1). In some embodiments, the data processing device 20 can alternatively trigger the sensor device 50 and a motor movement (e.g. trigger sensor, trigger motor, trigger sensor, trigger motor and so on). This can allow the capturing of a plurality of sensor data sets of the sample container 100 in multiple orientations of the sample container 100. For example, the data processing device 20 can trigger the sensor 50 to capture a first sensor data set. After, the first sensor data set is captured the data processing device 20 triggers the motor 30 to move the container base 132 and consequently the sample container 100. For example, the movement can be a clockwise rotational motion of 3.6°, causing the orientation of the sample container 100 to change by 3.6° relative to the initial position. After the rotational motion is completed the data processing device 20 can trigger the senor device 50 to capture another sensor data set and so on. After 100 of such cycles, the sample container 100 would have rotated by 360° (full rotation) and the sensor device 50 would have captured sensor data related to the whole lateral of the sample container 100—note that the rotations in this example were done by 3.6° at a time, thus after 100 motor triggers the sample container 100 would have rotated 360° relative to the initial position and after (or before) each rotation an respective sensor data set can be captured.

In the above, an exemplary step rotation of 3.6° was provided and described. However, it will be understood that in generally any step rotation can be used and any number of images of the sensor data sets related to the sample container 100 can be captured. In some embodiments, the rotation step can be set such that images of the whole lateral of the sample container 100 can be captured. The rotation step can be configured according to the field of view of the sensor device 50. For a sensor device 50 with a narrow field of view small rotation steps can be performed.

A sensor data set can be sensor data that the sensor device 50 can output after it performs a sensing session.

In some embodiments, the at least one sensor device 50 can comprise at least one visual sensor 50, such as at least one camera 50. The camera 50 can be configured to capture images of the sample container 100. More particularly, the camera 50 can be triggered to capture at least one sensor data set, wherein the sensor data set can comprise at least one image. A sensor data set captured by the camera 50 can comprise information related to the color of the sample container 100 and more particularly of the at least one sample 10 comprised in the sample container 100. The position of the camera 50 and/or the container base 132 and/or the sample container 100 can be adjusted such that the sample container 100 can be within the field of view of the camera 50. This can allow the camera 50 to capture images of the sample container 100 and more particularly of the at least one sample 10 contained in the sample container 100. It can be advantageous to provide a distinctive background (e.g. comprises a distinctive color) compared to the sample container 100 and more particularly to the at least one sample 10 contained in the sample container 100 when capturing images of the sample container 100. This can increase the visibility of the samples on an image of the sample container 100 and thus facilitate the detection of the samples on an image of the sample container 100. It will be noted, that the field of view of the camera 50 is what the camera 50 "sees", i.e. the view that will be projected on the images captured by the camera 50.

In such embodiments, wherein the sensor device 50 comprises at least one visual camera 50 (and/or a stereo camera 50) the sample imaging system 1 can further comprise at least one light emitter 70, such as, light emitting diodes (LED) 70, for example, as depicted in the embodiment of FIG. 2, two light emitters 70A and 70B for lightning two opposing sides of the sample container 100. The light emitters 70 can be configured to emit visible light (i.e. electromagnetic waves with wavelengths between 380 to 740 nm). A plurality of LEDs, such as three or four LEDs and/or one or more at different heights can also be installed. Moreover, LEDs for different light colors and/or intensities and/or for changing the light colors and/or intensities according to the needs can also be provided. The light emitters 70 can be advantageous as they can allow for better images of the sample container 100 to be captured particularly by the camera 50. The light emitter 70 can be controlled by the data processing device 20—thus a wiring between the data processing device 20 and the light emitters 70 can be advantageous. The data processing device can control at least one of: switching state (on/off), intensity, color of the light emitters 70. For example, the data processing device 20 can switch on the light emitters 70 only when an image of the sample container 100 is to be captured. The data processing device 20 can also adjust the brightness and/or color of the light emitted by the light emitters 70, e.g. during a calibration step, to facilitate the image processing algorithms that can be run on the images captured by the camera 50, such that better results and/or recognition can be achieved by the processing of said images.

In some embodiments, the at least one sensor device 50 can comprise at least one depth sensor 50, such as at least one stereo camera pair 50 and/or at least one ToF (time of flight) sensor 50. The depth sensor 50 can be configured to capture depth images of the sample container 100. More particularly, the depth sensor 50 can be triggered to capture at least one sensor data set, wherein the sensor data set comprises at least one depth image. A sensor data set captured by the depth sensor 50 (i.e. a depth image) can comprise information related to the distance of the sample container 100 and more particularly of the at least one sample 10 comprised in the sample container 100 from the depth sensor 50. The position of the depth sensor 50 and/or the container base 132 and/or the sample container 100 can be adjusted such that the sample container 100 can be within the field of view of the depth 50. This can allow the camera 50 to capture images of the sample container 100 and more particularly of the at least one sample 10 contained in the sample container 100.

In embodiments wherein the at least one sensor device 50 comprises at least one stereo camera pair 50, the at least one light emitter 70 can be provided to increase the visibility to the stereo cameras 50 of the sample container 100 and the at least one sample 10 contained in the sample container 100. In addition, it can be advantageous to provide a distinctive background (e.g. comprises a distinctive color) compared to the sample container 100 and more particularly to the at least one sample 10 contained in the sample container 100 when capturing images of the sample container. This can increase the visibility of the samples on an image of the sample container and thus facilitating the detection of the samples on an image of the sample container.

In embodiments wherein the at least one sensor device 50 comprises at least one ToF sensor 50, the at least one light emitter 70 can be provided close to the ToF sensor 50, such that the light emitted by the light emitter 70 can perform a round-trip from the light emitter 70 to a surface in the field of view of the ToF sensor 50 and back to the ToF sensor 50. For example, the sample imaging system 1 can comprise the light emitter 70C. The light emitter 70C can be configured to emit a pulse of light and the ToF sensor can be configured to sense the pulse of light after it has been reflected by a surface. Further, the properties of the emitted light (by the light emitter 70C) can be compared to the properties of the received light (by the ToF sensor 50) to calculate or estimate a distance travelled by the pulse of light. The ToF sensor 50 can comprise a plurality of sensing areas, each of which configured to sense the light emitted by the light emitted and reflected by a surface. Thus, each of the sensing areas of the ToF sensor 50 can receive light reflected by a respective surface on the field of view of the ToF sensor 50. Each of the received light signals (by the sensing areas) can be compared to the emitted light to calculate or estimate a distance travelled by the respective received light. The calculated or estimated distances (which can be divided by 2 as the light pulses perform a round trip) can be provided in a matrix structure, thus generating a distance image.

In some embodiments, the distance travelled by the light emitted by the light emitter 70C can be calculated or estimated based on the duration it took the light to perform the round-trip. The duration can be calculated based on the time of emission of the light and the time of reception. Alternatively, the distance travelled by the light emitted by the light emitter 70C can be calculated or estimated based on the phase difference between the emitted light and received light. In such embodiments, the emitted light 70C can be modulated to a carrier signal using a modulation scheme, such as, amplitude modulation. The modulation frequency (i.e. frequency of the carrier signal) can be selected such that the wavelength of the carrier signal is longer than distance between the sensor device 50 and the sample container 100. This can ensure that a signal reflected by the sample container 100 (and a sample contained in the sample container 100) directly towards the ToF sensor 50 is received by the ToF sensor 50 with a phase shift less than 360°. Thus, a one-to-one relation can be generated mapping a phase shift of the received signal to a distance travelled by the signal. If the modulation frequency (i.e. frequency of the carrier signal) is shorter than distance between the sensor device 50 and the sample container 100 a one-to-one relation may not be directly generated mapping a phase shift of the received signal to a distance travelled by the signal. However, even in such cases different techniques may be utilized to disambiguate the distance to phase shift mapping. For example, the amplitude of the received signal can be further considered to make distance measurement less ambiguous.

In some embodiments, the ToF sensor 50 can be configure to sense infrared light. In such embodiments the light emitter 70C can be configured to emit infrared light.

In some embodiments, the at least one sensor device 50 can comprise at least one scanning sensor 50, such as, a LIDAR (light detection and ranging) sensor 50, which for the sake of brevity can also be referred to as LIDAR 50. The LIDAR 50 can be configured to measure a distance to the sample container 100 using a narrow beam (i.e. ray) of light. Generally, LIDARs comprise a narrow field of view, which may not cover the entire sample container 100 or a predefined portion of the sample container 100 (such as the body 13). Thus, the LIDAR can be configured to measure multiple distances to the sample container 100 using a plurality of narrow beams of light. More particularly, the LIDAR can be configured to scan the sample container 100 or a portion of the sample container 100 with a high likelihood of the at least one sample 10 of the sample container 100 being positioned on the said region. For example, the LIDAR 50 can be configured to scan the body 13 of the sample container 100 or a middle section of the body 13. In such embodiments, the sensor device 50 and more particularly the LIDAR 50 can be attached to a motion generator apparatus (e.g. the sensor positioning device 55, see FIG. 1) that can be configured to move the sensor device 50 and more particularly the LIDAR 50 for scanning the sample container 100.

In such embodiments, wherein the sensing device 50 can comprise at least one LIDAR 50, the at least one light emitter 70 can be provided close to the LIDAR 50, such that the light emitted by the light emitter 70 can perform a round-trip between the LIDAR and a surface on the field of view of the LIDAR 50 that can reflect the emitted light. For example, the sample imaging system 1 can comprise the light emitter 70C. The light emitter 70C can be configured to generate a narrow beam light. For example, the light emitter 70C can comprise a laser 70C.

The LIDAR 50 can measure distances to surfaces on the field of view of the LIDAR, similar to a ToF sensor. However, the LIDAR can generally be characterized with high range resolution and thus higher accuracy. On the other hand, LIDAR generally comprises a smaller field of view than a ToF sensor—hence may require a motion generator apparatus, such as, the sensor positioning device 55, for scanning the sample container 100 or a portion of the sample container 100.

In some embodiments, the sensor device 50 may comprise an ultrasound sensor 50. In addition, an ultrasound generator can be provided to the sample imaging system 1. The ultrasound generator can generate ultrasound waves that can travel in a direction from the ultrasound sensor 50 to the sample container 100 and reflected back to the ultrasound sensor 50 (i.e. perform a round-trip between the ultrasound sensor and the sample container). Thus, through sonography an image of the sample container 100 and the samples contained in the sample container 100 can be generated. Obtaining sample data using the ultrasound sensor 50 can be facilitated by obtaining a ground measurement or calibrating measurement. The calibrating measurement can, for example, be a measurement of an empty sample container 100. A further calibrating measurement can be a measurement of a sample container 100 filled with a fixation liquid. The calibrating measurement can be used to improve the quality of sonography by removing the artefacts created by the sample container 100 and/or the fixation liquid therein.

It will be understood that although in FIG. 2 the data processing device 20 is depicted as a single component, the data processing device 20 can comprise multiple components. For example, the data processing device 20 can comprise multiple processing unit (e.g. one for controlling the sensor device 50, anther for controlling the motion generator apparatus 30, another for processing the data-set output by the sensor device 50, etc.). The data processing device 20 may also be a distributed processing system, wherein a portion of computations are executed by a processing device 20 on a first location and at least one further portion of computations is executed by a processing device 20 on at least one further location. For example, a server (or cloud computing system) may be configured to execute a portion of required computations The sample imaging system 1 can further comprise at least one user interface 60 for allowing for data input/output to/from the data processing device 20. The user interface 60 can comprise output user interfaces, such as screens or monitors configured to display visual data (e.g. images captured by the camera 50 and/or processed images) and/or speakers configured to output audio data and/or signals (e.g. audio and/or optical signals indicating a status of the image capturing process) and/or printing devices configured to output information on an output media. Further, a message or signal may be conveyed to a communication network and/or to an IT system like a cloud. The user interface 60 can comprise input user interfaces, such as: keyboard configured to allow the insertion of text and/or other keyboard commands (e.g. allowing the user to enter text data and/or other keyboard commands by having the user type on the keyboard) and/or trackpad, mouse, touchscreen, joystick—configured to facilitate the navigation through different graphical user interface(s).

The embodiment of the sample imaging system 1 illustrated in FIG. 2 comprises a particular arrangement of the sample imaging system 1. That is, in the embodiment of the sample imaging system 1 depicted in FIG. 2, sensor data sets of different sides of the sample container 100 can be captured by rotating the sample container 100, preferably according to its vertical central axis depicted in FIG. 2 with dashed line. By rotating the sample container 100, different sides of the sample container 100 can be exposed to the field of view of sensor device 50—which can allow the sensor device 50 to acquire sensor data for different sides of the sample container 100. In general, the sample container 100 can be rotated between 2-400 times and thus 2-400 different sensor data sets can be obtained. That is, the sample container can be rotated stepwise, with a rotation step of at most 180° and at least 0.9° and wherein after each rotational step a sensor data set is obtained.

Figure 5:
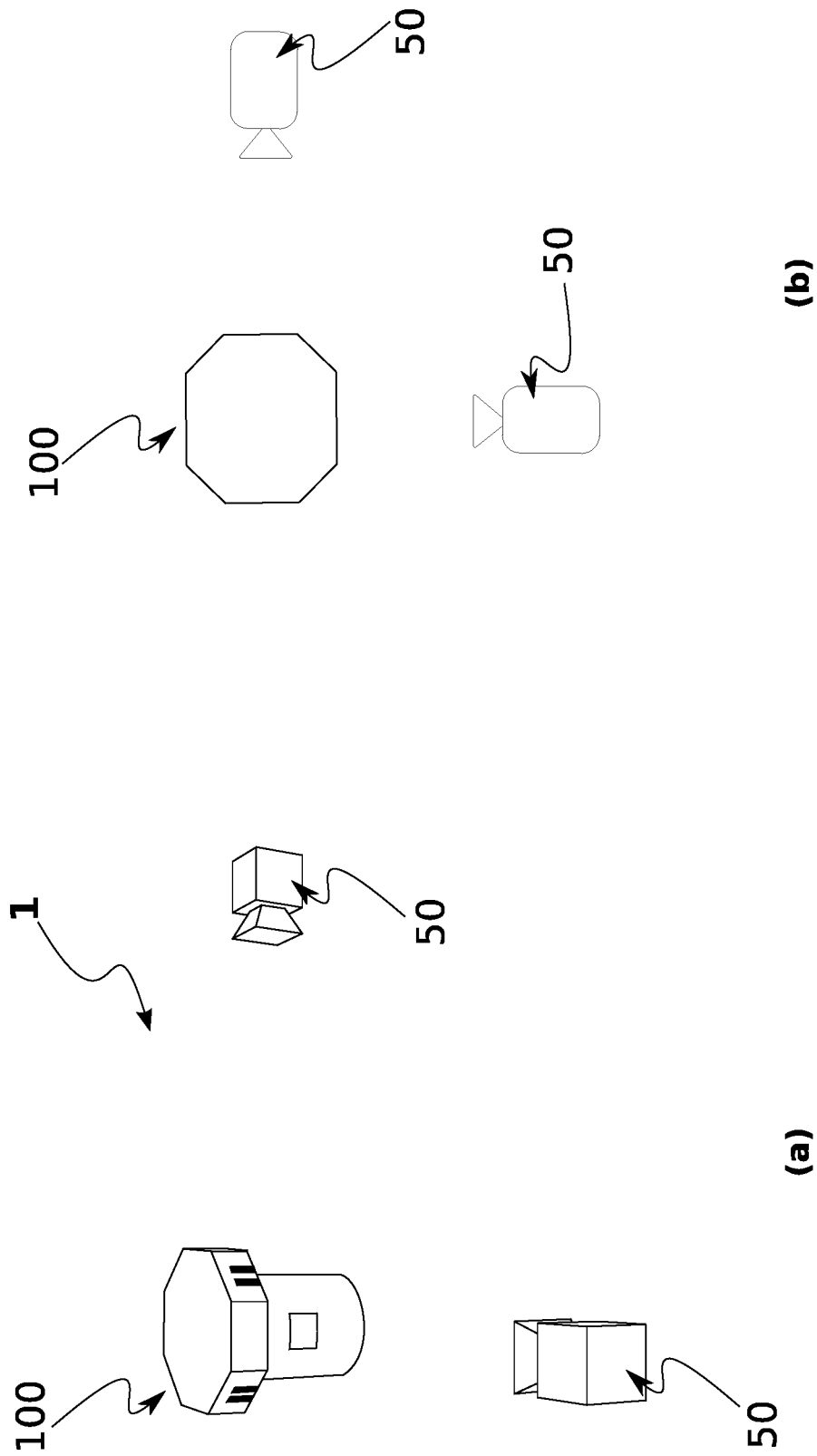
FIG. 5 depicts a schematic of a third exemplary embodiment of the sample imaging system configured to acquire sensor data related to a sample container via two sensor devices and to generate a computerized three-dimensional model of at least one sample provided in the sample container.
Figure 6:
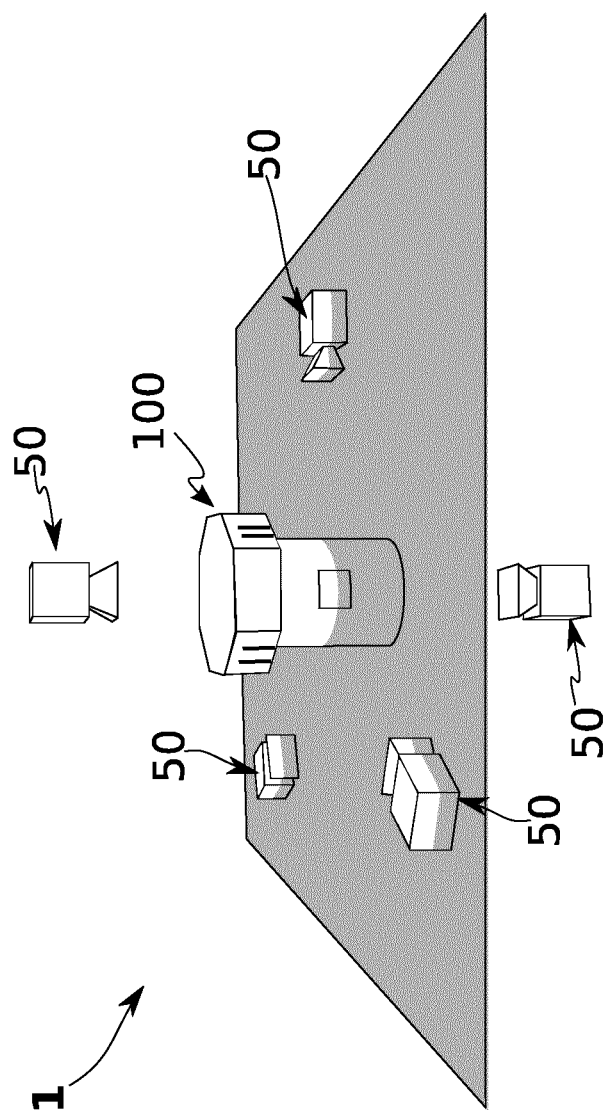
FIG. 6 depicts a schematic of a fourth exemplary embodiment of the sample imaging system configured to acquire sensor data related to a sample container via five sensor devices and to generate a computerized three-dimensional model of at least one sample provided in the sample container.

However, the sample imaging system 1 can comprise other configurations which can allow for the acquisition of sensor data sets from different sides of the sample container 100. With respect to FIGS. 4 to 6 a non-limiting list of different configurations of the sample imaging system 1 is provided. It will be noted that some of the features and characteristics of the sample imaging system 1 described above in conjunction with FIGS. 1 and 2 are also used in the embodiment depicted in FIGS. 4-6, e.g., the particular sensors that can be comprised by the sensor device 50. For sake of brevity of description, in the below, only additional or differentiating features present in the embodiment depicted in FIGS. 4-6 are discussed.

Figure 4:
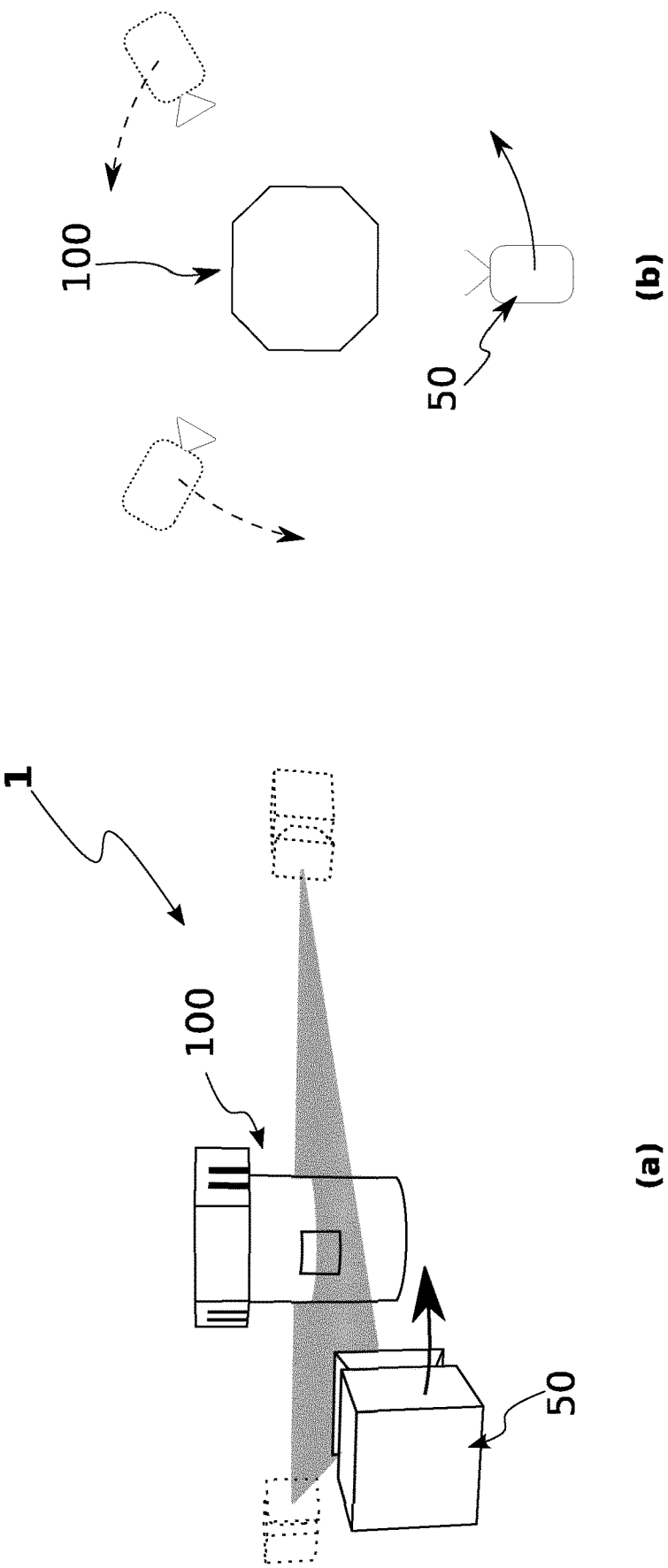
FIG. 4 depicts a schematic of a second embodiment of the sample imaging system.

FIG. 4 depicts a further embodiment of the sample imaging system 1. More particularly, FIG. 4a depicts a perspective view of an illustrative arrangement between the at least one sensor device 50 and the sample container 100 and FIG. 4b depicts a top view of the illustrative arrangement between the at least one sensor device 50 and the sample container 100, according to an aspect of the present invention. For sake of brevity, only the at least one sensor device 50 and the sample container 100 are depicted in FIG. 4. However, it will be understood that the sample imaging system 1 according to the embodiment of FIG. 4 can comprise any feature of the sample imaging system 1 according to the embodiments of FIGS. 1 and 2, such as and not limited to, the processing device 20 and light emitter 70.

In addition, the sample imaging system 1 according to the embodiment of FIG. 4 can be configured to allow the at least one sensor device 50 to be positioned in multiple poses relative to the sample container 100 such that for each pose it can comprise a field of view towards a respective and different (or slightly different) side of the sample container 100. In some embodiments, the sample imaging system 1 can comprise the sensor positioning device 55 (see FIG. 1) that can be configured to rotate the at least one sensor device 50 around the sample container 100. For example, the at least one sensor device 50 can be rotated such that the axis of rotation can coincide with the central vertical axis (illustrated in FIG. 2) of the sample container 100. As depicted in FIG. 4, the at least one sensor device 50 can be positioned in different positions relative to the sample container 100, as illustrated therein by the sensor 50 drawn with interrupted lines.

In the particular example of FIG. 4, the at least one sensor device 50 can be positioned on a plurality of positions relative to the sample container 100. The plurality of positions can lie in the same plane. The plane can be perpendicular to the central vertical axis of the sample container 100 or to the surface of the sample container 100. The at least one sensor device 10 positioned on each of the said positions can comprise a field of view towards the lateral of the sample container 100. The said plurality of positions can for example be uniformly distributed on a circle on the said plane with a center on the central vertical axis of the sample container. For example, the plurality of positions can comprise two positions separated by 180° from each other—i.e. the second position can be reached by rotating by 180°. In FIG. 4, three positions of the at least one sensor device 50 are illustrated. From a first position, the second position can be reached by rotating the sensor device 50 by 120° around the sample container 100 (e.g. in a circle with the center on the central vertical axis of the sample container 100). The third position can be reached by rotating the at least one sensor device 50 by 120° around the sample container.

In general, the sensor device 50 can be positioned in 2-400 different positions and thus 2-400 different sensor data sets can be obtained.

On each position the at least one sensor device 50 can capture at least one sensor data set. For example, if the at least one sensor device 50 comprises at least one camera 50, at least one image of the sample container 100 can be captured from each position. Thus, it can be advantageous, to move the at least one sensor device 50 relative to the sample container 100, such that, sensor data regarding different sides of the sample container 100 can be captured. In one embodiment, this can be achieved by rotating the at least one sensor device 50 around sample container 100.

Furthermore, as the lateral of the body 13 of the sample container 100 can generally be transparent to the at last one sensor device 50, particularly when the at least one sensor device 50 comprises at least one camera 50, ToF sensor 50 or LIDAR 50, it can be advantageous to rotate the at least one sensor device 50 according to a vertical rotational axis. This can provide a view of the at least one sensor device 50 towards the lateral of the sample container 100. However, the base and/or the top (i.e. the cap 11) of the sample container 100 can also be configured to be transparent for the at least one sensor device 50. Thus, in some embodiments, the at least one sensor device 50 can also be rotated according to a horizontal axis of rotation (not shown).

In general, the at least one sensor device 50 can be handled or moved or transported or rotated, such that it can obtain sensor data at multiple viewing angles. For example the at least one sensor device 50 can be positioned in any point on the surface of at least one sphere with the center on the sample 10 and/or in any point on the surface of at least one cylinder with the central axis coinciding with the central vertical axis of the sample 10 and/or in any point of at least one circle with the center on the sample 10.

Furthermore, the system according to the embodiment illustrated in FIG. 2 can be combined with the system according to the embodiment illustrated in FIG. 4. More particularly, the sample imaging system 1 can be configured to provide motion to the sample container 100 and the at least one sensor device 50. This can be advantageous for two reasons. Firstly, it can be advantageous to put the sample container 100 in motion, such as, translational motion according to the vertical direction, prior to capturing at least one sensor data set. This can allow the at least one sample in the sample container 100 to float in the fixation liquid in the sample container 100—hence allowing a better view of the at least one sample 10. Secondly, moving both the sensor device 50 and the sample container 100 may increase the number of arrangements or viewing angles between the sensor device 50 and the sample container 100.

On the other hand, the sample imaging system 1 can be configured to combine or synchronize the movements of the at least one sensor device 50 and the sample container 100. For example, in the embodiment of FIG. 2 a full rotation of the sample container 100 may be required. In the embodiment of FIG. 4 a full rotation of the at least one sensor device 50 around the sample container 100 may be required. However, by combining the two movements, the at least one sensor device 50 and the sample container 100 may be required to rotate less. Additionally, in embodiments wherein the at least one sensor device 50 rotates according to a horizontal axis of rotation, images from all the sides (including top and bottom) of the sample container 100 can be captured.

In some embodiments, the sample imaging system 1 can comprise a plurality of sensor devices 50. That is, the sample imaging system 1 can comprise at least two sensor devices 50. Two particular embodiments, of the sample imaging system 1 with a plurality of sensor devices 50 are illustrated in FIGS. 5 and 6.

FIG. 5 depicts a further embodiment of the sample imaging system 1. More particularly, FIG. 5*a* depicts an illustrative arrangement between two sensor devices 50 and the sample container 100 from a perspective view and FIG. 5*b* depicts the illustrative arrangement between two sensor devices 50 and the sample container 100 from a top view, according to an aspect of the present invention. For sake of brevity, only the at least one sensor device 50 and the sample container 100 is depicted in FIG. 5. However, it will be understood that the sample imaging system 1 according to the embodiment of FIG. 5 can comprise feature of the sample imaging system 1 according to the embodiment of FIG. 2, such as and not limited to, the processing device 20 and light emitter 70.

The embodiment of the sample imaging system 1 according to FIG. 5, comprises two sensor devices 50. The two sensor devices 50 can be positioned, such that, they can view different sides of the sample container 100. For example, the two sensor devices 50 can comprise perpendicular fields of view towards the sample container 100. This can be advantageous, as the two viewing angles can be correlated to estimate the 3D shape of at least one sample 10 in the sample container 100.

FIG. 6 depicts a further embodiment of the sample imaging system 1. For sake of brevity, only the at least one sensor device 50 and the sample container 100 is depicted in FIG. 6. However, it will be understood that sample imaging system 1 according to the embodiment of FIG. 6 can comprise feature of the sample imaging system 1 according to the embodiment of FIG. 2, such as and not limited to, the processing device 20 and light emitter 70.

The embodiment of the sample imaging system 1 illustrated in FIG. 6 is a generalization of the embodiment illustrated in FIG. 5. More particularly, the sample imaging system 1 according to the embodiment of FIG. 6 comprises five sensor devices 50, wherein three sensor devices 50 comprise fields of view towards the lateral of the sample container 100, one sensor device 50 comprises a field of view towards the top of the sample container 100 and one sensor device 50 comprises a field of view towards the bottom of the sample container 100.

In general, the more viewing angles toward the sample container 100, the better the accuracy of the 3D model of the sample container 100 and/or the at least one sample 10 in the sample container 100 can be. The plurality of viewing angles can be provided through different embodiments of the sample imaging system 1. In some embodiments, the sample container 100 can be rotated while the at least one sensor device 50 captures sensor data sets, as illustrated in FIG. 2. In some embodiments, the at least one sensor device 50 can be rotated around the sample container 100, as depicted in FIG. 4. In some embodiments, multiple sensor devices 50 can be provided in different positions and/or orientations to provide the plurality of viewing angles towards the sample container 100, as illustrated in FIGS. 5 and 6.

In some embodiments, the at least one sensor device 50 can comprise only one type of sensors. For example, the at least one sensor device 50 can comprise at least one camera 50, or at least one ToF sensor 50, or at least one stereo camera 50, or at least one LIDAR 50, or at least one ultrasound sensor 50. Alternatively, in some embodiments the at least one sensor device 50 can comprise a combination of sensors. For example, the at least one sensor device 50 can comprise a combination of at least one camera 50, at least one ToF sensor 50, at least one stereo camera 50, at least one LIDAR 50, at least one ultrasound sensor 50.

Figure 7:
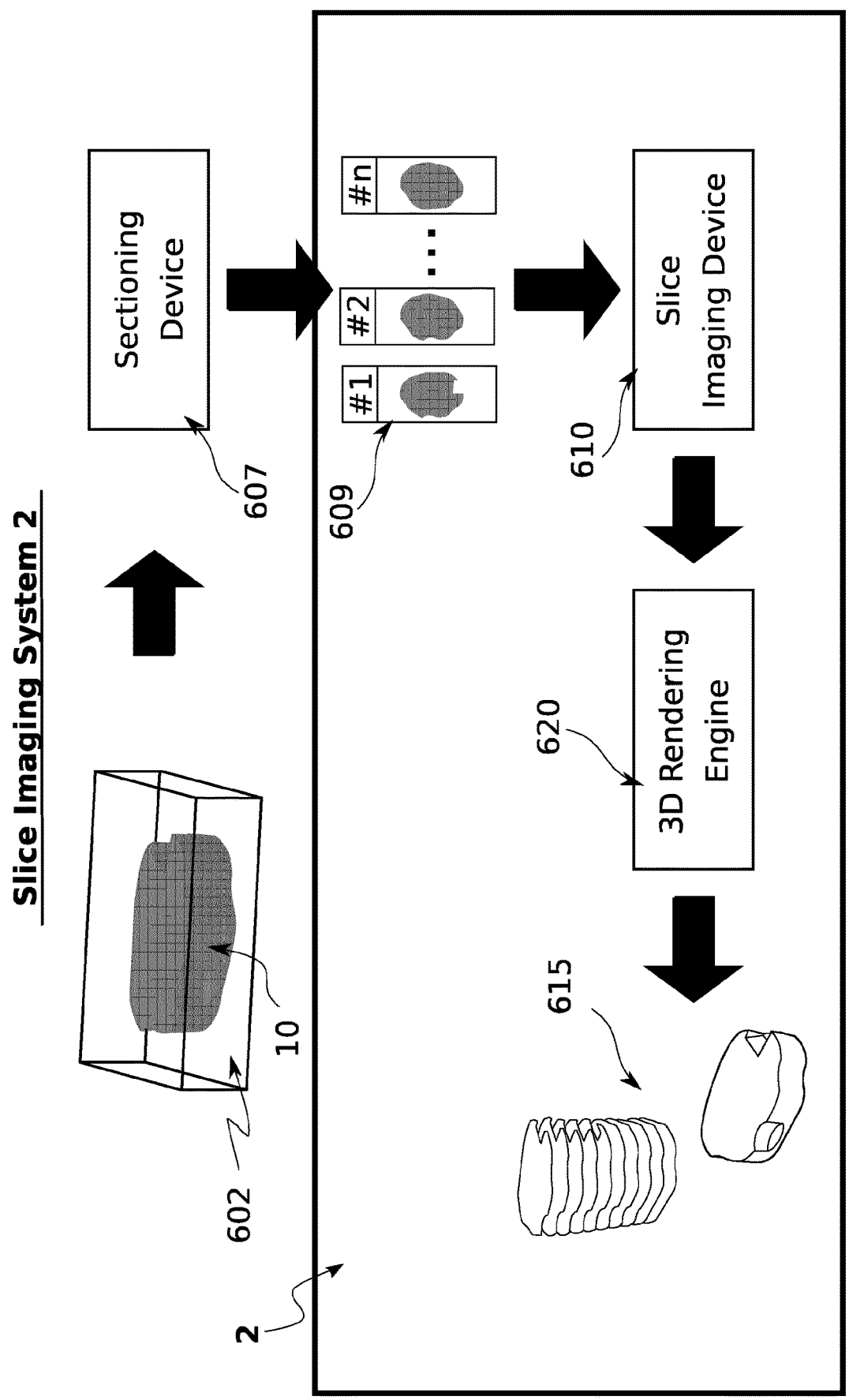
FIG. 7 depicts a general schematic of a slice imaging system configured for generating a computerized three-dimensional model of a sample based on images of the cross-sections (or slices) of the sample.

FIG. 7 illustrates a slice imaging system 2 configured to generate a computerized 3D model of a specimen or biopsy sample. Part of treatment of a biopsy sample in a histology laboratory comprises embedding the biopsy sample in a hardening medium, such as paraffin, during a process generally referred to as embedding. Further, embedded samples are cut into thin sections using a microtome, in a process generally referred to as sectioning. The sections are put into slides, stained and prepared for investigation by a skilled person under the microscope. Alternatively, instead of embedding the samples in a hardening medium such as paraffin, the samples may be frozen and then sliced. Either method of preparing the biopsy sample for histological examination involves cutting the sample into thin slices.

Slice imaging system 2 as illustrated in FIG. 7 can be generally configured to generate 3D models of at least one sample 10 based on images of the cut sections (i.e. slices) of the sample. More particularly, a sample 10, e.g. a biopsy sample 10, is embedded in a hardening medium 602 such as paraffin wax 602 (or can be frozen). The sample 10 embedded in wax 602 (or frozen) can be cut into sections by a sectioning device 607, such as a microtome 607. The slices can be put into slides 609. Thus, a plurality of slides 609, each comprising slices of the sample 10, can be created during the sectioning process. The sections may be further stained, to emphasize the cellular structures and thus make them easier to examine.

Each slice of the sample 10 provides a cross-sectional view of the sample 10. The slice imaging system 2 can be configured to receive a plurality of slices of the sample 10. In some embodiments the slice imaging system 2 can be configured to receive the plurality of slices of the sample 10 directly. Alternatively, the slice imaging system 2 can be configured to receive the slices of the sample 10 attached on a slide 609 (as illustrated in FIG. 7). The later can be more advantageous as the slices can lie flat on the slides 609 which can facilitate imaging them. Furthermore, information related to the slices (e.g. slice thickness) can be provided on a slide label that can be attached to the slides 609.

The slice imaging system 2 can comprise a slice imaging device 610. The slides 609 (or the slices) can be provided to the slice imaging device 610. The slice imaging device 610 can be configured to image (i.e. obtain sensor data related to) the slides 609. That is, in some embodiments, images of all the slices that were cut from the sample 10 can be captured. However, as this may be a time-consuming process to improve time-efficiency only a portion of slides 609 may be provided to the slice imaging device 610. Preferably, the portion of slides 609 provided to the slice imaging device 610 can be evenly distributed among all the slides 609, for example, every other slide 609 is provided to the slice imaging device 610, or every third slide 609 is provided to the slice imaging device 610 and so on. However, in some embodiments a preferred portion of the sample 10 can be selected for generating a 3D model and correspondingly a portion of the slides 609 can be selected and provided to the slice imaging device 610. For example, only slides 609 corresponding to a center portion of the sample 10 can be provided to the slice imaging device 610.

The images of the slides 609 captured by the slice imaging device 610 can be provided to a 3D rendering engine 620. In addition, further information indicating features of the slices, parameters used during the sectioning process and other similar data can be provided to the 3D rendering engine 620. Said further information may comprise the thickness of the slices, the position of the slices on the sample 10 (e.g. a sequential number indicating the order of the slices), orientation of the slices relative to each other, etc. Said information can be provided on a slide label (not shown). The slide label can be stuck and/or written and/or printed on the slide 609. The slide label can comprise human and/or machine-readable data regarding the respective slice attached on the slide 609.

The 3D rendering engine can comprise a data processing unit that can be configured for image processing and 3D rendering. The 3D rendering engine 620 can be configured to receive images captured by the slice imaging device 610. The 3D rendering engine can detect and extract from the received images the shape of the cross-sections (i.e. slices) of the sample 10. This can be facilitated by configuring the slice imaging device 610 to capture the images of the slides 609 on a distinctive background from the sample 10. The shape of the cross-sections of the sample 10 can be extracted from an image using, for example, an edge detection algorithm.

Furthermore, the 3D rendering engine 620 can then generate a 3D model 615 of the sample 10 based on the cross-sections extracted from the image slides. The generation of the 3D model 615 can be further based on the thickness of the detected slices, orientation of the detected slices, position of the slices on the sample (i.e. order of the slices) and position of the slices relative to each other. That is, using the same set of slices but different slice thickness, orientations, order and or position may lead to different (and inaccurate) 3D models 615.

In some embodiments, the thickness of each cross-section can be provided to the 3D rendering engine 620. The thickness of each cross-section depends on the configuration of the microtome 607 when cutting the sample 10 into sections. Furthermore, the total number of cuts can be provided to the 3D rendering engine 620. This can facilitate the estimation of the thickness of the sample 10. In some embodiments, the 3D rendering engine 620 may obtain the slide thickness from the sectioning device 607 by reading (or receiving) the slice thickness setting on the sectioning device 607. Alternatively, or additionally, the slice thickness can be provided on a label (e.g. a machine-readable code, such as, a bar code, QR code, etc.) on the slide 609. Alternatively, or additionally, the slice imaging system 2 may comprise a sensor (not shown) configured to measure the slice thickness.

In some embodiments, the slice images can be provided to the 3D rendering engine in an ordered manner (according to the order that the sections were cut) and/or a sequence of numbers specifying the order of the images can be provided to the 3D rendering engine. That is, the slice imaging system 2 can be configured to maintain the order of slices during the sectioning process by the sectioning device 607 and imaging process by the slice imaging device 610 and any other in-between process, e.g. staining. That is, in some embodiments the slices or slides 609 are provided in order to the slice imaging device 610. In some embodiments, an order number can be provided on a label (e.g. a machine-readable code, such as, a bar code, QR code, etc.) on the slide 609.

In some embodiments, the 3D rendering engine 620 can be configured to order the slices based on edge similarities between subsequent slices. That is, based on the rationale that the samples 10 can generally comprise a smooth shape, it can be expected that subsequent slices comprise a similar shape (i.e. similar edges). Using this rationale, the 3D rendering engine 620 can be configured to order the slices. For example, the 3D rendering engine 620 can be configured to calculate an edge similarity score. The edge similarity score can be calculated between any two slices and it can be configured to be dependent or independent on slice orientation. If dependent on slice orientation, the same pair of slices can have different edge similarity score for different orientations relative to each other. If independent on slice orientation (e.g. a perimeter of the edge, or histogram of the image of the slice) the same pair of slices always comprises the same edge similarity score. Based on the edge similarity scores between pairs of slices, a global edge similarity score can be calculated. For any slice ordering, a respective global edge similarity score can be calculated. The 3D rendering engine can determine the order of the slices that maximizes the global edge similarity score or that comprises a global edge similarity score higher than a threshold level. It will be understood, that the above simplified algorithm represents only an exemplary algorithm of ordering the slices.

As discussed, another important aspect for reconstructing a 3D model from the images of the slices of the sample 10 is the slice orientation. In some embodiments, the slice imaging system 2 can be configured to maintain the orientation of the slices at least until they are imaged by the imaging device 610. This may require careful handling of the slices from the sectioning device 607 to the slice imaging device 610. Maintaining slice orientation can be advantageous as little or no further processing may be required from the 3D rendering engine 620 for determining the orientation of the slices while rendering the 3D model 615. However, this may not always be possible to achieve as it can be challenging to maintain the orientation of slices while handling them. Thus, in some embodiments, the 3D rendering engine 620 can be configured to properly orient the slices (i.e. the images of the slices). Orienting the slices can be based on the edge similarities between subsequent slices.

In some embodiments, a similar algorithm to the one discussed above for slice ordering can be used. For example, the 3D rendering engine 620 can simultaneously order and orient the slices. In general, the 3D rendering engine 620 may be configured to transform the edges (i.e. not only rotate, but also other operations such as move, scale, skew, etc.).

In addition, the 3D rendering engine 620 can be configured to receive or determine a reference (or template) shape. The reference shape can for example be a slice that is the least deformed one—i.e. the slice that best shows the shape of the sample 10. The reference shape can be particularly used to orient and/or order the slices.

Additionally, still the 3D rendering engine 620 can receive a general structure or general shape of the sample 10. For example, the 3D rendering engine can receive a shell model of the sample 10. This can particularly facilitate orienting and/or ordering the slices.

The use of a reference shape (or slice) and/or general shape (e.g. shell model) can be advantageous in minimizing image registration errors (e.g. z-shift) during the 3D rendering of the slide images.

The slice imaging system 2 can thus generate a 3D model 615 (which can also be referred to as the second 3D model 615). The second 3D model 615 can comprise a solid model of the sample 10. That is, in addition to the outer shape (i.e. shape of the surface) of the sample 10, the second 3D model 615 can comprise cross sectional views of the sample 10.

Figure 8:
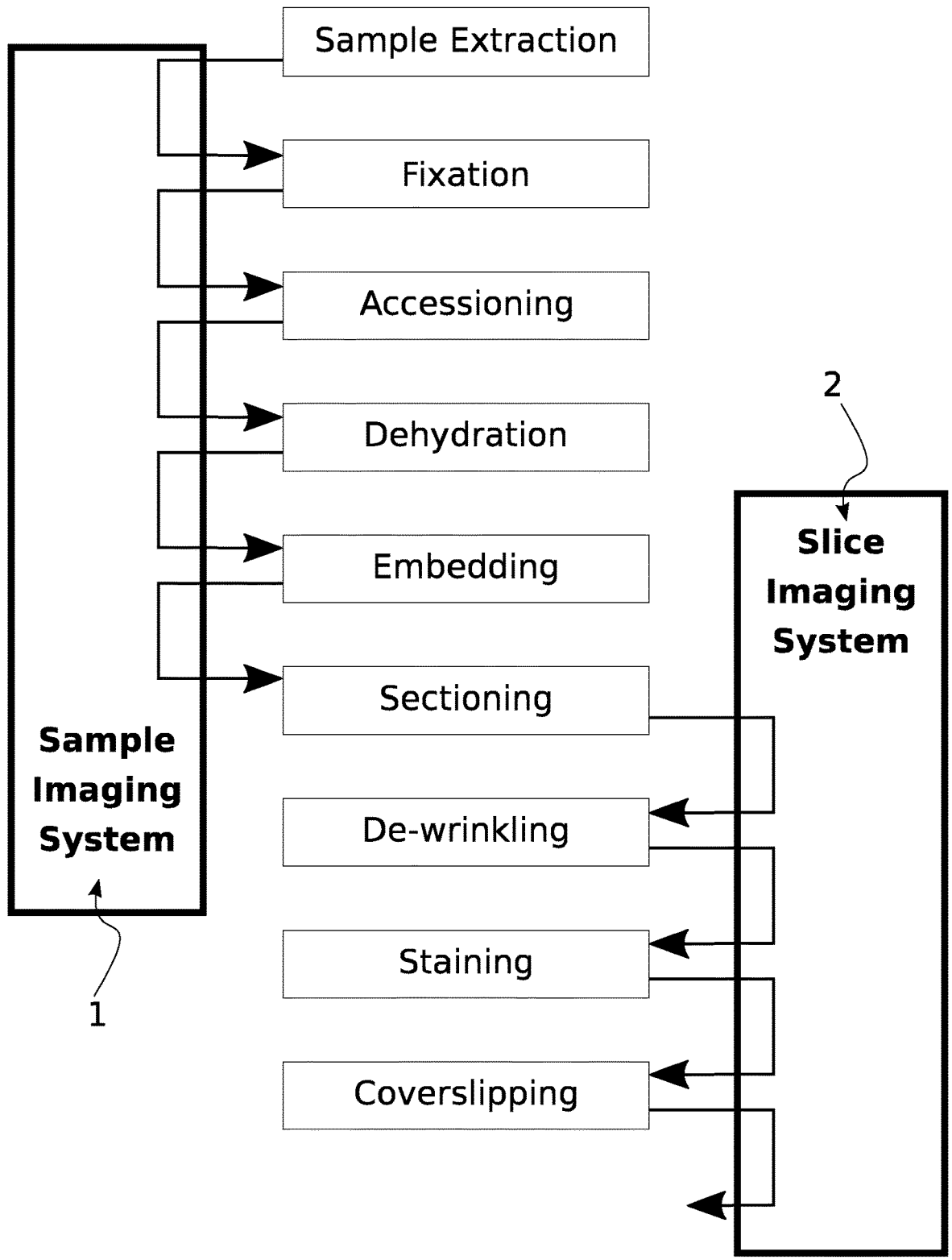
FIG. 8 depicts exemplary utilizations of the sample imaging system and slice imaging system during sample preparation for histological examination.

FIG. 8 illustrates a plurality of steps or techniques commonly used during sample preparation for histological examination. In a first step, sample extraction, the sample can be extracted from an originating body (e.g. patient). The sample is then immersed in a fixative to prevent the sample from decaying. Generally, the samples are put in containers with a fixation liquid, such as, formalin. For further examination, the samples are sent to a histology laboratory. In the histology laboratory, the samples are accessioned. Sample accessioning comprises registering the received samples by recording data related to the received samples. This data may include information related to the specimen(s), such as number of sample container(s), respective origin of sample container(s), number of specimens in each sample container, type of specimen(s), possible diseases infecting the specimen(s), etc. Afterwards, the samples are separated from the fixation liquid, dehydrated, embedded in paraffin and then sectioned. During sectioning, the sample is cut into multiple slices. The slices can then be de-wrinkled (commonly by immersing them on warm water), attached to a microscope slide, stained and cover slipped. At this stage, the slides can be observed under the microscope by a professional (e.g. pathologist).

Up to the sectioning step, the sample is not intruded (i.e. it is still as a whole). After sectioning, the sample is cut into multiple slices. The sample imaging system 1 can be utilized to perform at least one first imaging step during which sensor data of the sample before the sectioning step are obtained to generate a first 3D model 25, as discussed with reference to any of the FIGS. 1 to 6. The slice imaging system 2 can be utilized to perform at least one second imaging step during which sensor data of the slices of the sample after the sectioning step are obtained to generate a second 3D model 615, as discussed with reference to FIG. 8.

The first imaging step and/or the second imaging step can be performed only once and a respective 3D model of the sample can be generated, as discussed. Alternatively, the first imaging step and/or the second imaging step can be performed multiple times, preferably after different steps. This can facilitate tracking the changes on the sample after each step. For example, the first imaging step can be performed once during (or after) accessioning phase and once more during or after the dehydration step and by comparing the 3D models generated during the preformation of each first imaging step, the effect of the dehydration step (e.g. sample shrinkage) on the sample can be detected. Similarly, the first 3D model 25 generated by the sample imaging system 1 can be compared with the second 3D model 615 to infer or detect or determine a change of the sample due to the histological treatment, e.g. dehydration. For example, by comparing the shape, size and/or volume of the second 3D model 615 with the first 3D model 15 a change in the shape, size and/or volume of the sample can be determined. It can further be determined that the sample change can be caused by at least one of the histological techniques performed between the first imaging step (performed by the sample imaging system 1) and the second imaging step (performed by the slice imaging system 2).

Figure 9:
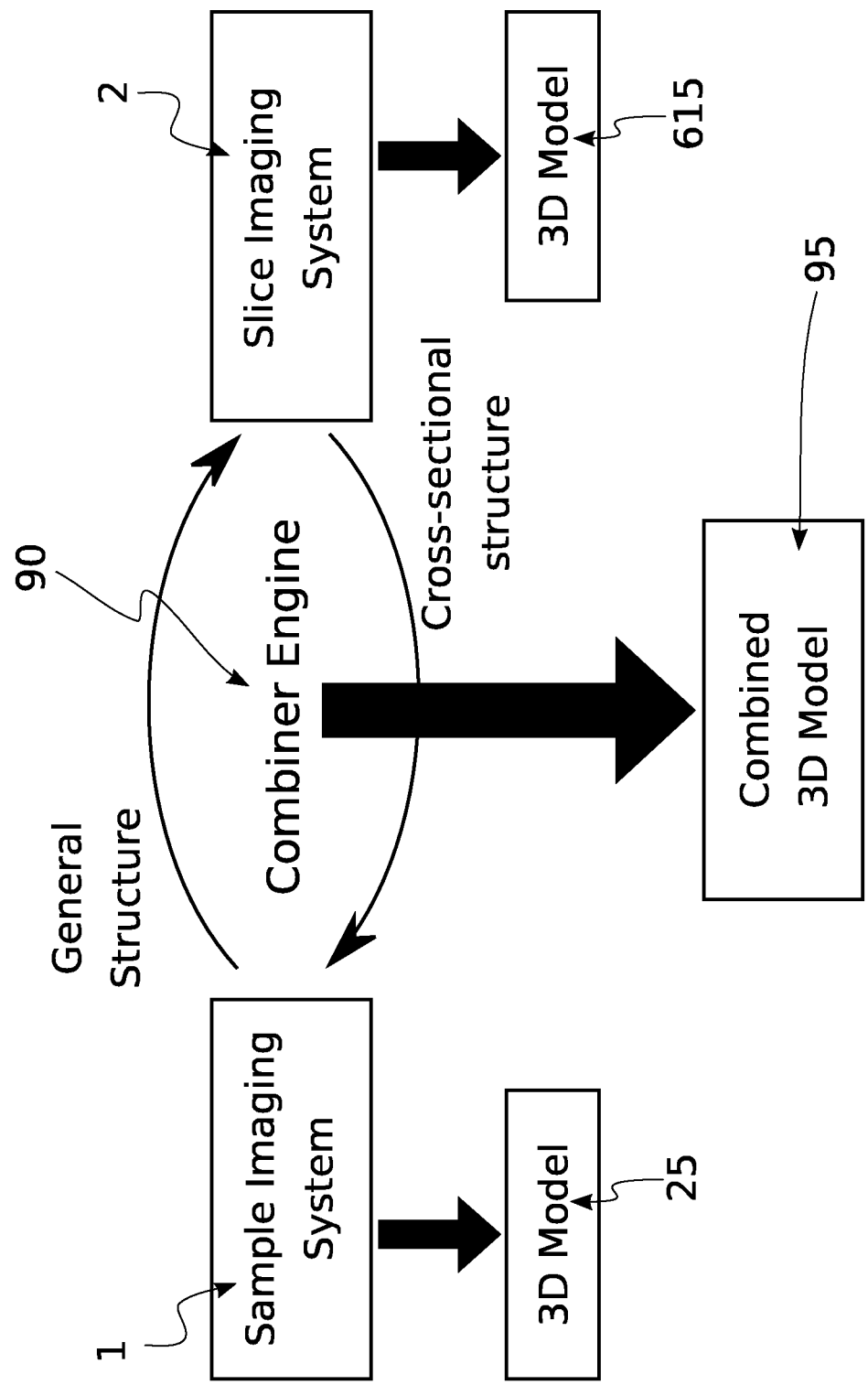
FIG. 9 depicts a system comprising the sample imaging system and the slice imaging system and configured to generate a combined three-dimensional model.

FIG. 9 illustrates a system comprising the sample imaging system 1 and the slice imaging system 2 configured to generate a combined or improved 3D model 95, which can also be referred to as a third 3D model 95.

As discussed, particularly with reference to FIGS. 1 to 6, the sample imaging system 1 can be configured to generate a first 3D model 25 from sensor data of the whole sample 10. The first 3D model 25 can comprise a shell or boundary model configured to represent the surface (or faces) of the sample 10. During the generation of the first 3D model by the sample imaging system 1, the sample 10 is as a whole. For example, as discussed in FIG. 8 the sample imaging system can be utilized before the sample sectioning step. As such, the first 3D model 25 can more accurately represent the general structure (or outer shape) of the sample 10.

As discussed, particularly with reference to FIG. 8, the slice imaging system 2 can be configured to generate a second 3D model 615 from sensor data of the slices of the sample 10. The second 3D model 25 can comprise a solid model configured to represent the surface (or faces) of the sample 10 and the internal structure (or cross-sectional views) of the sample 10. During the generation of the second 3D model 615 by the slice imaging system 2, images of different cross-sections (i.e. slices) of the sample 10 can be obtained. For example, as discussed in FIG. 8 the slice imaging system 2 can be utilized after the sample sectioning step. As such, the second 3D model 615 can more accurately represent the internal structure (i.e. cross-sections) of the sample 10.

That is, first 3D model 25 more accurately represents the outer shape of the sample 10, while lacking the modeling of the internal structure of the sample 10. In contrary, the second 3D model 615 can accurately model the internal structure of the sample 10 (through the cross-sectional views) however it may be less accurate on modeling the outer structure of the sample 10 (as information regarding the general outer shape of the sample can be lost during the sectioning step and dehydration step). As such, the present technology further provides a combiner engine 90. The combiner engine 90 can be configured to generate a combined 3D model 95 based on the first 3D model 25 and the second 3D model 615. More particularly, the combiner engine 90 can extract general structure information (e.g. outer shape) from the first 3D model 25 and internal structure information from the second 3D model 615 and based on the extracted information generate the combined 3D model 95.

In some embodiments, the combined 3D model 95 can be generated by fitting the slices of the second 3D model on the first 3D model 25. That is, the combiner engine 90 can be configured to position each slice of the second 3D model on the respective position on the first 3D model. During this step the slices may be rotated, scaled, skewed, moved, etc. The combiner engine 90 may calculate a matching score.

The matching score may be a parameter configured to indicate how well the edge of the slice matches the shape of the first 3D model 25. The combiner engine may position a slice within the first 3D model 25 such that the said matching score can be maximized. Based on the matching score of each slice, the combiner engine 90 can be configured to calculate a global matching score. The combiner engine 90 can be configured to arrange (or position) the slices such that the global matching score can be maximized. In some embodiments, the arrangement of the slices within the first 3D model 25 can be an iterative process, wherein different slice positioning can be checked and the one with the maximum (or good enough, i.e. higher than a threshold) matching score can be determined.

Alternatively, or additionally, the slices of the sample 10 can be synthesized utilizing the general structure of the sample 10 that can be extracted from the first 3D model 25. That is, as discussed with respect to FIG. 7, generally the reconstruction of a 3D model from cross-sectional images may require a reference shape. The reference can be used as a "ground truth", which can facilitate transforming the slices (i.e. rotating, moving, re-ordering, skewing, scaling, etc.) to reconstruct the 3D model. This process is generally referred as image registration. The combiner engine 90 can be configured to extract from the 3D model the reference shape of the sample and use that to reconstruct the combined 3D model 95 from the slices of the second 3D model 615.

The generation of the combined 3D model can be advantageous as it can accurately represent both the outer and internal structure of the sample 10.

Figure 10:
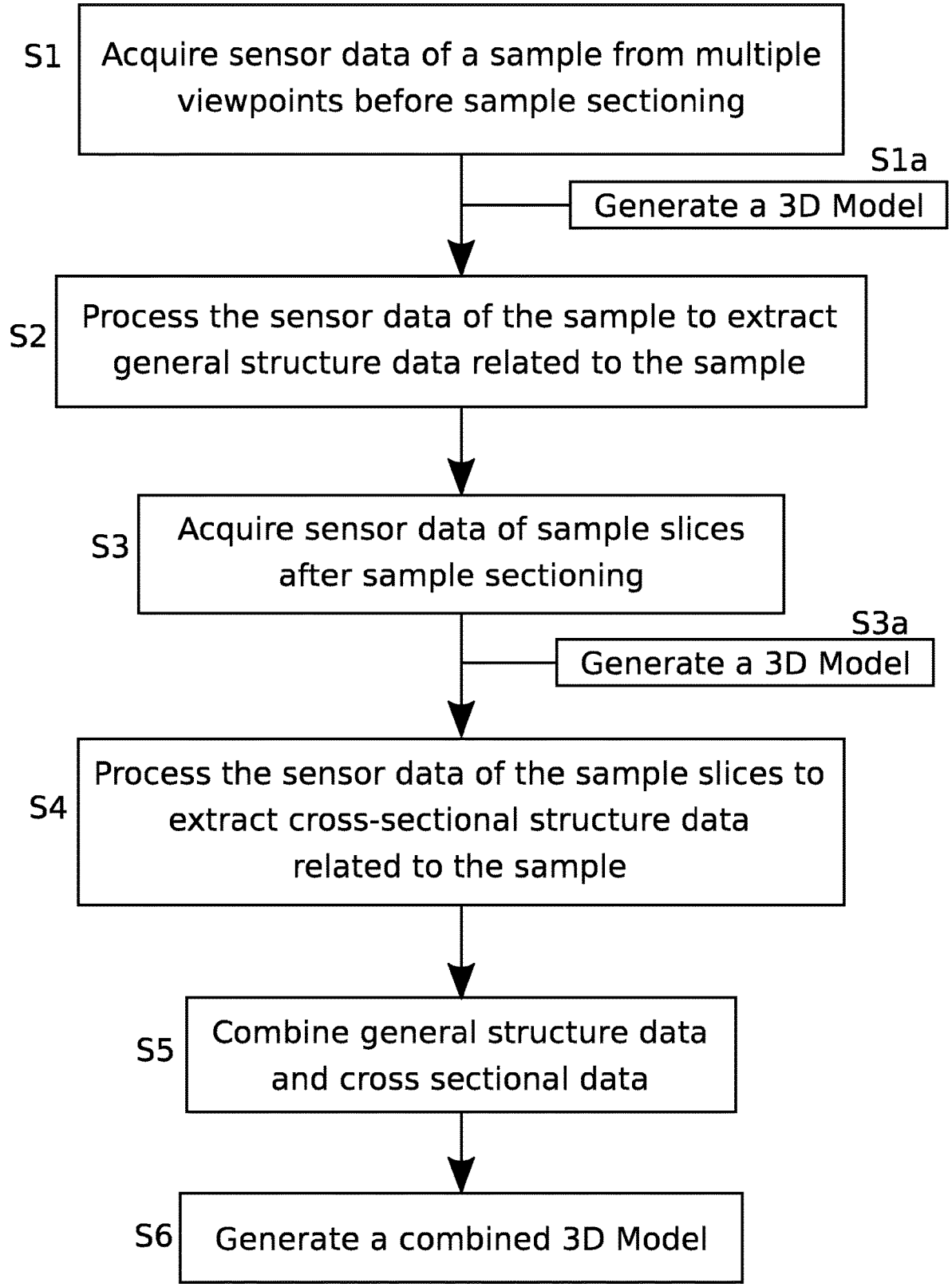
FIG. 10 depicts a method for generating a combined three-dimensional model of a sample.

While FIG. 9 illustrates a system for generating a combined 3D model 95, FIG. 10 illustrates a method for generating a combined 3D model 95.

A first step S1 comprises acquiring sensor data of a sample from multiple viewpoints (or viewing angles) before sample sectioning. That is, sensor data of the sample as a whole can be captured. Based on the acquired sensor data a first 3D model 25 can be generated in a step S1a (as discussed particularly with reference to FIGS. 1 to 6). Step S1 and S1a can be facilitated by the sample imaging system 1, illustrated in FIGS. 1 to 6.

In a step S2 the sensor data of the sample (acquired during step S1) can be processed to extract general structure data (e.g. outer shape) related to the sample 10. Alternatively, or additionally, the generated first 3D model 25 (generated in step S1a) can be processed to extract general structure data (e.g. outer shape) related to the sample 10. Step S2 can be performed by the data processing device 20 and/or by the combiner engine 90.

In a step S3 the method can comprise acquiring sensor data of the slices of a sample 10 after sample sectioning. That is, sensor data (e.g. images) of the sample slices can be captured. Based on the acquired sensor data a second 3D model 615 can be generated in a step S3a (as discussed particularly with reference to FIG. 7). Step S3 and S3a can be facilitated by the slice imaging system 2, depicted in FIG. 7.

In a step S4 the sensor data of the sample slices (acquired during step S3) can be processed to extract cross-sectional structure data related to the sample 10. Alternatively, or additionally, the generated second 3D model 615 (generated in step S3a) can be processed to extract cross-sectional structure data of the sample 10. Step S4 can be performed by the 3D rendering engine 617 and/or by the combiner engine 90.

In a step S5, the method can comprise combining general structure data and cross-sectional data, to generate in step S6 a combined 3D model. Steps S5 and S6 can be performed by the combiner engine 90, as discussed in FIG. 9.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, preferred embodiments have been described with reference to the accompanying drawings, the skilled person will understand that these embodiments were provided for illustrative purpose only and should by no means be construed to limit the scope of the present invention, which is defined by the claims.

The invention claimed is:

1. A system comprising:
   a sample imaging system configured to:
      acquire, prior to slicing the sample, a plurality of first sensor data sets related to an outer surface of the sample and
      generate a first 3D model based on the plurality of first sensor data sets;
   a slice imaging system configured to:
      acquire, after slicing the sample into slices, a plurality of second sensor data sets related to the slices of the sample and
      generate a second 3D model based on the plurality second data sets; and
   a combiner engine configured to generate a combined 3D model of the sample based on the first 3D model of the sample and the second 3D model of the sample,
   wherein the combiner engine is configured to calculate a matching score configured to indicate a fitness level of the at least one cross-sectional view on the first 3D model,
   wherein the matching score is calculated based on a fitness between edges of the at least one cross-sectional view and edges of the first 3D model and
   wherein the combiner engine is configured to fit the at least one cross-sectional view to the first model such that said matching score can be maximized.

2. The system of claim 1, wherein
   the first 3D model comprises a boundary model of the sample representing the outer surface of the sample and
   the second 3D model comprises a solid model of the sample comprising at least one cross sectional view of the sample representing the internal structure of the sample.

3. The system according to claim 2, wherein the combiner engine is configured to generate the combined 3D model by fitting the at least one cross-sectional view of the sample obtained from the second 3D model to the first 3D model.

4. The system according to claim 1, wherein the combiner engine is configured to generate the combined 3D model by executing an image registration algorithm during which the plurality of second sensor data sets of the slices of the sample are registered using the first 3D model as a reference, wherein registering the plurality of second sensor data sets comprises bringing them into spatial alignment.

5. The system according to claim 1, wherein the combiner engine is configured to generate the combined 3D model based on at least one sample change parameter, and
wherein the sample change parameter indicates a change of the physical and/or chemical structure of the sample, such as, a change caused to the sample during histological processing, and
wherein the sample change parameter can comprise a shrinking parameter and/or a color change parameter and/or a shape change parameter.

6. The system of claim 1, wherein the sample imaging system comprises:
at least one sensor device configured to acquire the plurality of first sensor data sets and
a data processing device configured to process the plurality of first sensor data sets to generate the first 3D model of the sample.

7. The system of claim 6,
wherein the data processing device is configured to extract a respective shape of at least one face of the sample from a respective first sensor data set of the plurality of first sensor data sets.

8. The system of claim 6, wherein the sample imaging system comprises
a sample positioning device configured to move the sample, such that multiple sides of the sample are positioned within the field of view of the at least one sensor device and/or
a sensor positioning device configured to handle or transport or move or rotate the at least one sensor device, such that the at least one sensor device can be positioned in multiple poses relative to the at least one sample and/or
a plurality of sensor devices with different viewing angles toward the sample.

9. The system of claim 6, wherein the at least one sensor device comprises
at least one visual sensor configured to capture visual images of the sample and/or
at least one depth sensor configured to capture distance images of the sample.

10. The system of claim 1, wherein the slice imaging system comprises:
a slice imaging device configured to acquire the plurality of second sensor data sets and
a three-dimensional rendering engine configured to process the plurality of second sensor data sets to generate a second 3D model of the sample.

11. The system of claim 10, wherein the slice imaging system is configured to receive the plurality of slices of the sample, wherein a slice of the sample is a cross section of the sample and wherein the slice of the sample is generated by cutting the sample with a sectioning device configured to cut thin slices of a material, such as, a microtome.

12. The system of claim 10, wherein the slice imaging device comprises at least one visual sensor configured to capture images of the slices of the sample.

13. The system of claim 10, wherein the three-dimensional rendering engine is configured to
extract a respective shape of at least one slice of the sample from a respective second sensor data set of the plurality of second sensor data sets and
generate the second 3D model based on the respective shape of the at least one slice of the sample.

14. The system of claim 10, wherein the 3D rendering engine is configured to generate the second 3D model based on additional information indicating features of the slices of the sample, wherein the additional information comprises at least one of
the thickness of the slices;
the position of the slices on the sample, such as, the order of the slices; and/or
the orientation of the slices relative to each other or any combination thereof.

15. The system according to claim 1, wherein the sample is at least one of a histological, pathological, forensic pathology, medical, biological, veterinary, agricultural tissue and/or biopsy sample.

16. A method for generating a combined 3D model of a sample, the method comprising the steps of:
acquiring, prior to slicing the sample, a plurality of first sensor data sets related to an outer surface of the sample via at least one sensor device;
processing with a data processing device the plurality of first sensor data sets to extract general structure data related to the sample;
acquiring, after slicing the sample into slices, a plurality of second sensor data sets related to the slices of the sample via a slice imaging device;
processing with a 3D rendering engine the plurality of second sensor data sets to extract cross-sectional data related to the sample; and
combining with a combiner engine the general structure data and the cross-sectional data to generate a combined 3D model of the sample;
wherein the combiner engine calculates a matching score configured to indicate a fitness level of the at least one cross-sectional view on the first 3D model,
wherein the matching score is calculated based on a fitness between edges of the at least one cross-sectional view and edges of the first 3D model and
wherein the combiner engine fits the at least one cross-sectional view to the first model such that said matching score can be maximized.

17. The method of claim 16,
wherein the general structure data comprises a boundary model of the sample representing the surface of the sample and
the cross-sectional data comprises at least one cross sectional view of the sample.

18. The method of claim 16, wherein combining with a combiner engine the general structure data and the cross-sectional data comprises
the combiner engine executing an image registration algorithm during which the plurality of second sensor data sets of the slices of the sample are registered using the general structure data as a reference,
wherein registering the plurality of second sensor data sets comprises bringing them into spatial alignment.

* * * * *